US012747949B1

(12) United States Patent
Hibbert et al.

(10) Patent No.: US 12,747,949 B1
(45) Date of Patent: Sep. 29, 2026

(54) ROUTING OF A SEABORNE VESSEL

(71) Applicant: Hibble Ltd., London (GB)

(72) Inventors: Adrian Hibbert, London (GB); Joel Hipple, London (GB); Manjunandan Sushant Vernekar, London (GB); Parineet Vernekar, London (GB)

(73) Assignee: Hibble Ltd., London (GB)

( * ) Notice: Subject to any disclaimer, the term of this patent is extended or adjusted under 35 U.S.C. 154(b) by 0 days.

(21) Appl. No.: 19/337,722

(22) Filed: Sep. 23, 2025

(51) Int. Cl.
*G01C 21/20* (2006.01)
*B60W 30/182* (2020.01)

(52) U.S. Cl.
CPC .................................. *G01C 21/203* (2013.01)

(58) Field of Classification Search
CPC ... G01C 21/20; G01C 21/203; B60W 30/182; B60W 20/20; B60W 10/08
See application file for complete search history.

(56) References Cited

U.S. PATENT DOCUMENTS

2009/0192702 A1* 7/2009 Bourne .............. G01C 21/3469 701/532
2013/0124088 A1* 5/2013 Bruce .................. G01C 21/203 701/527
2016/0195399 A1* 7/2016 Nanri ...................... B63B 49/00 701/21
2021/0027225 A1* 1/2021 Mikalsen ............ G06F 3/04847
2021/0285772 A1* 9/2021 Yamaumi ............. G01C 21/203
2021/0293542 A1* 9/2021 Ikeda ..................... B63H 25/04
2022/0171398 A1* 6/2022 Grossman ......... B60W 60/0021
2025/0382039 A1* 12/2025 Armstrong .............. B63B 49/00

* cited by examiner

*Primary Examiner* — Tan Q Nguyen
(74) *Attorney, Agent, or Firm* — SankerIP

(57) ABSTRACT

Apparatus, systems, methods, and instructions are described, relating to the routing of a seaborne vessel. Some examples receive information indicative of an energy consumption rate of the seaborne vessel, and modify departure/arrival times in dependence on the information. Some examples limit a route based on a bearing range to reduce meandering and U-turns, to reduce energy consumption.

11 Claims, 10 Drawing Sheets

116

Candidate routes module

Figure 1A:
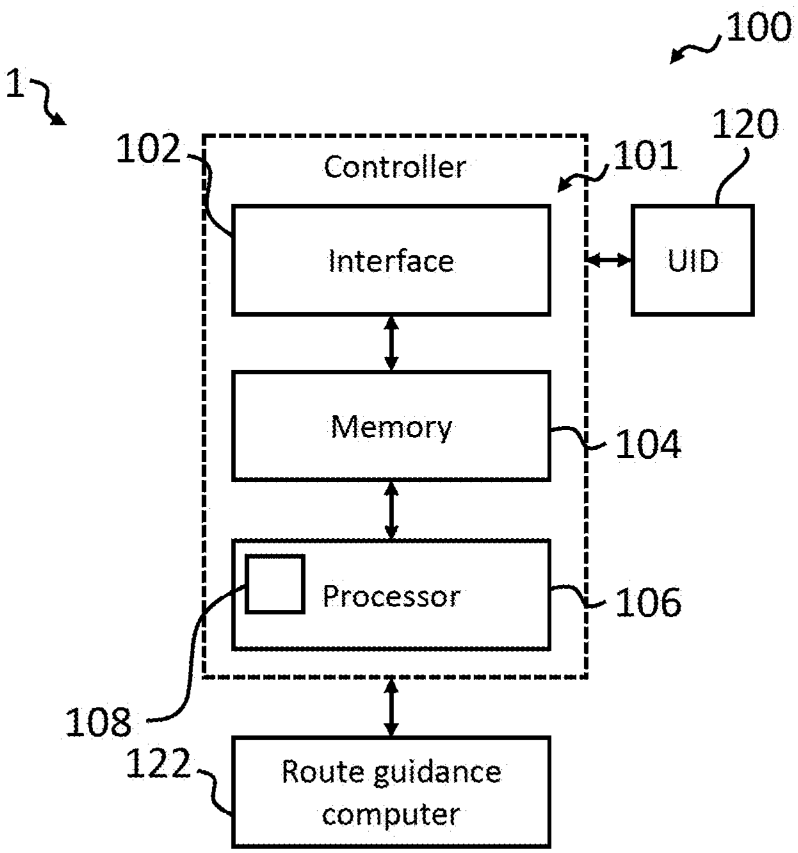

| **Routes** | **Fuel used** |
|---|---|
| Palma > Livorno > Barcelona > Valencia > Palma | 193.3 |
| Palma > Barcelona > Marseille > Cagliari > Palma | 204.4 |
| Palma > Almeria > Alicante > Barcelona > Palma | 255.7 |
| Palma > Genoa > Marseille > Barcelona > Palma | 294.2 |

118

Route navigation module

| Port | Date | Arr | Dep | Speed | Fuel used |
|---|---|---|---|---|---|
| Palma | 01/09/25 | -- | 2000 | | |
| Livorno | 03/09/25 | 0700 | 1800 | 14.2 | 167.9 |
| Barcelona | 06/09/25 | 0900 | 2000 | 17.4 | 61.4 |
| Valencia | 07/09/25 | 0700 | 1800 | 16.0 | 55.5 |
| Palma | 08/09/25 | 0600 | -- | 14.1 | 52.2 |

FIG. 2C

ROUTING OF A SEABORNE VESSEL

TECHNICAL FIELD

Examples of the disclosure relate to routing of a seaborne vessel. Some relate to routing of a ship.

BACKGROUND

Most routing techniques for vehicles concern determining the most time-efficient or fuel-efficient route between known nodes including a predetermined destination and predetermined waypoints.

SUMMARY

According to some aspects, there is provided the subject-matter of the independent claims. Some further aspects are defined in the dependent claims. The dependent claims can depend on any preceding claim unless they are contextually incompatible.

The below embodiments and optional features primarily relate to routing of a seaborne vessel between nodes in the form of ports. However, the underlying methods are mostly not limited to seaborne vessels and ports, and are applicable to the routing of any vehicles between any types of nodes such as waypoints and/or destinations.

According to various, but not necessarily all, embodiments of the invention there is provided an apparatus comprising: at least one processor; and at least one memory storing instructions that, when executed by the at least one processor, cause the apparatus at least to perform:

- receiving information indicative of a preliminary departure time and a preliminary arrival time, of a leg of a route of a seaborne vessel;
- receiving information indicative of an energy consumption rate of the seaborne vessel;
- determining at least one of a scheduled departure time different than the preliminary departure time, or a scheduled arrival time different than the preliminary arrival time, in dependence on the information indicative of an energy consumption rate of the seaborne vessel; and
- modifying the preliminary departure time to the scheduled departure time, in memory, and/or modifying the preliminary arrival time to the scheduled arrival time, in memory.

An advantage of changing the departure and/or arrival times in this manner is that the seaborne vessel is able to minimize total energy consumption, in situations where the preliminary times were not calculated with any regard to energy consumption.

Optionally, the instructions, when executed by the at least one processor, cause the apparatus at least to perform: selecting an arrival node of the leg from a dataset of nodes, in dependence on a predetermined 'depart after time' and/or a predetermined 'arrive before time', wherein the preliminary departure time is based on the 'depart after time', and/or wherein the preliminary arrival time is based on the predetermined 'arrive before time'.

This describes an example use case where the preliminary times were not calculated with any regard to energy consumption. A candidate routes module comprising automatic route-building instructions is configured to select one of multiple possible arrival nodes that are reachable overnight or within a predetermined number of sea days, based on initial default constraints including a 'depart after time' and an 'arrive before time'. These constraints ensure that the arrival node is possible to reach, but the seaborne vessel may sail at an inefficient speed if it departs exactly at the 'depart after time' and arrives exactly at the 'arrive before time'. Therefore, once the arrival node has been selected, the departure time and/or arrival time are changed in dependence on the information indicative of the energy consumption rate, as described earlier.

Optionally, determining the scheduled departure time and/or scheduled arrival time is further dependent on a distance of the leg. Optionally, determining the scheduled departure time and/or scheduled arrival time comprises determining a parameter indicative of the total energy consumption in dependence on the energy consumption rate and a distance of the leg. Optionally, the energy consumption rate is dependent on a required speed of the leg, wherein the required speed of the leg is dependent on departure and arrival timings. Optionally, determining the scheduled departure time and/or scheduled arrival time comprises determining the required speed of the leg, in dependence on the distance and on at least one iteration variable indicative of a departure time and/or arrival time of the leg. Optionally, the information indicative of an energy consumption rate of the seaborne vessel comprises data indicative of a relationship between speed and a rate of energy consumption of the seaborne vessel. Since the best departure and arrival times depend on the energy consumption rate, which in turn depends on the speed, which in turn depends on the departure and arrival times, an iterative approach may be used. Therefore, determining the scheduled departure time and/or scheduled arrival time is optionally executed iteratively until the parameter indicative of the total energy consumption satisfies a condition (e.g., minimum value).

An advantage is further reducing total energy consumption. The lowest total energy consumption does not necessarily mean sailing as slowly as possible. A slower speed means that less energy is consumed per hour, but more hours are spent consuming it. Therefore, the modified times may either cause the required speed of the leg to converge towards a most efficient speed of the seaborne vessel, or diverge if the energy saving of sailing for a shorter duration outweighs the energy cost of sailing faster.

Optionally, determining the parameter indicative of total energy consumption comprises:

- determining the required speed of the leg in dependence on at least one iteration variable indicative of a departure time and/or arrival time of the leg;
- determining the rate of energy consumption corresponding to the required speed;
- determining a duration of the leg in dependence on the at least one iteration variable;
- multiplying the duration with the determined rate of energy consumption to determine the parameter indicative of total energy consumption;
- iteratively changing the at least one iteration variable until the parameter indicative of total energy consumption satisfies the condition (e.g., minimum value); and
- determining the scheduled departure time and/or scheduled arrival time in dependence on a value of the at least one iteration variable corresponding to the parameter satisfying the condition. For example, the preliminary departure time and/or preliminary arrival time may be modified to match the value, or may be modified towards the value (taking into account any relevant constraints).

Optionally, determining the scheduled departure time comprises modifying a departure time of the leg from the preliminary departure time, within an allowable departure range (e.g., predetermined departure range) of the preliminary departure time. Optionally, the allowable departure range is a substantially fixed time range, substantially independent of a distance, speed, and duration of the leg. Optionally, the allowable departure range is a predetermined time duration having a value of up to 30 minutes or up to 1 hour or up to 1.5 hours or up to 2 hours, and/or a user-preset time.

Optionally, the allowable departure range limits how much earlier the scheduled departure time is allowed to be than the preliminary departure time, and/or how much later the scheduled departure time is allowed to be than the preliminary departure time. Optionally, the allowable departure range allows more delaying than advancing relative to the preliminary departure time. Optionally, the allowable departure range limits how much earlier the scheduled departure time is allowed to be than the preliminary departure time, by a value selected from the range up to 30 minutes, or up to 1 hour, or up to 1.5 hours, or less than 2 hours, and/or a user-preset time.

An advantage of the allowable departure range is that time spent at a departure node of the leg prior to departure is optimized. For example, if the route is a cruise and the departure node comprises a port and a tourist destination, the allowable departure range ensures that the energy optimization of the departure time is balanced against the time that occupants need to spend at the departure node. For example, the tourist destination may be located several miles away from the port and/or may have evening activities available. Therefore, the allowable departure range penalizes excessively early departures. A late departure may be much more acceptable.

Optionally, the modifying of the departure time is dependent on the preliminary arrival time, and modifying the scheduled arrival time has a lower priority than modifying the departure time. Optionally, determining the scheduled arrival time different than the preliminary arrival time is dependent on the allowable departure range and/or a speed constraint (e.g., maximum speed) limiting how long the departure time is modified (e.g., delayed) from the preliminary departure time, before the parameter indicative of total energy consumption satisfies the condition. Optionally, the leg is an overnight leg.

An effect is that modifying (e.g., delaying) the departure time is prioritized over modifying (e.g., advancing) the arrival time. An advantage is that there is more utility for the occupants if the departure time is delayed e.g. from 6 μm to 8 μm, than if the arrival time is advanced e.g. from 6 am to 4 am. This is because occupants can spend longer at the departure port, whereas they are unlikely to wake up at 4 am to disembark at the arrival port.

Optionally, determining the scheduled arrival time comprises modifying an arrival time of the leg from the preliminary arrival time, within an allowable arrival range (e.g., predetermined arrival range) of the preliminary arrival time. Optionally, the allowable arrival range is a substantially fixed time range, substantially independent of a distance, speed, and duration of the leg. Optionally, the allowable arrival range is different than the allowable departure range. Optionally, the allowable arrival range is wider than the allowable departure range. Optionally, the allowable arrival range has a duration having a value selected from the range up to 4 hours, or up to 6 hours, or less than 8 hours, and/or a user-preset time.

Optionally, the instructions, when executed by the at least one processor, cause the apparatus at least to perform:

receiving route constraints comprising at least a departure time request, an arrival time request, and optionally a sea days time limit; and selecting nodes for adding to the route from a dataset of nodes, in dependence on the route constraints, wherein the leg of the route is between a pair of the selected nodes. Optionally, the dataset of nodes is stored in the at least one memory. The node selection may be executed automatically, without user intervention.

An advantage is a computationally-efficient candidate routes module for automatically determining energy-efficient routes. If the dataset of nodes comprises hundreds or thousands of nodes, or more, the maximum number of possible routes would be computationally-infeasible to calculate and would involve sailing over very long distances, unless constraints are provided. The departure time request, arrival time request, and sea days time limit are constraints which filter down the number of selectable arrival nodes to those which are reachable overnight, or in a specified consecutive sea days limit, when departing from the departure node in accordance with the departure time request and arriving in accordance with the arrival time request. These reduce the maximum number of possible routes by many orders of magnitude. Therefore, there is a higher degree of confidence that the determined candidate routes represent the lowest possible energy consumption, out of all the possible route permutations.

Optionally, the route constraints further comprise a minimum speed of the seaborne vessel. Optionally, the route constraints further comprise a maximum speed of the seaborne vessel. Optionally, the sea days time limit comprises a consecutive sea days limit. Optionally, the departure time request comprises a depart after time. Optionally, the arrival time request comprises an arrive before time.

An advantage of the minimum and maximum speed, along with the sea days time limit, depart after time, and arrive before time, is limiting the number of automatically selectable nodes to those within a minimum and maximum distance/radius of the departure node. Therefore, an arrival node too close to the departure node will not be selected. Furthermore, an arrival node very far from the departure node will not be selected, to reduce energy consumption and limit the number of consecutive sea days. Once a node between the minimum and maximum distance has been selected, energy optimization can be carried out by modifying the departure and/or arrival time as described above.

Optionally, selecting the nodes for adding to the route comprises determining which nodes of the dataset of nodes are reachable by the seaborne vessel departing in accordance with the depart after time, arriving in accordance with the arrive before time, optionally travelling within the sea days time limit, and travelling between the minimum speed and maximum speed:

wherein the preliminary departure time is based on the depart after time;

wherein the preliminary arrival time is based on the arrive before time;

wherein a preliminary speed of the leg is a value between the minimum speed and the maximum speed;

wherein determining the scheduled departure time and/or scheduled arrival time is configured to change a speed of the leg from the preliminary speed to a different speed, requiring the different speed to be between the minimum speed and maximum speed; and/or wherein the scheduled departure time is different than the depart after time and/or the scheduled arrival time is different than the arrive before time.

An advantage is that the candidate routes module is able to select from a variety of arrival nodes, and then once an arrival node has been selected the departure and arrival times are optimised to reduce energy consumption.

Optionally, the instructions, when executed by the at least one processor, cause the apparatus at least to perform:

determining a plurality of candidate routes including the route, wherein determining the plurality of candidate routes comprises, for each candidate route, selecting nodes for adding to the candidate route from the dataset of nodes, in dependence on the route constraints, and setting the selected nodes as part of the candidate route;

determining a list of the plurality of candidate routes; and causing output of information indicative of the list of the plurality of candidate routes on a graphical user interface of a user interface device, optionally wherein the information is configured to discriminate between the plurality of determined candidate routes in dependence on an energy consumption of each candidate route. Optionally, the discrimination comprises the information displaying the energy consumption of each candidate route, and/or ranking the candidate routes by energy consumption, and/or highlighting candidate routes associated with a below-threshold energy consumption.

An advantage is that the candidate routes module can provide a plurality of unique candidate routes for the user to select, and help the user to determine which routes have the lowest energy consumption.

Optionally, the determination of the plurality of candidate routes comprises determining a maximum number of possible routes compliant with the route constraints.

Optionally, the information indicative of an energy consumption rate of the seaborne vessel comprises data indicative of a relationship between speed and a rate of energy consumption of the seaborne vessel.

Optionally, the instructions, when executed by the at least one processor, cause the apparatus at least to perform: repeating the non-optional operations (and optionally the optional operations) for each leg of the route.

Optionally, the instructions, when executed by the at least one processor, cause the apparatus at least to perform: determining first information indicative of an energy consumption of the leg or route in dependence on the preliminary departure time and/or preliminary arrival time. Optionally, the instructions, when executed by the at least one processor, cause the apparatus at least to perform: determining second information indicative of an energy consumption of the leg or route in dependence on the scheduled departure time and/or scheduled arrival time. Optionally, the instructions, when executed by the at least one processor, cause the apparatus at least to perform: outputting, to the graphical user interface of the user interface device, information indicative of a difference between the first information and the second information, to indicate an amount of energy saved associated with the modifying of the preliminary departure time and/or preliminary arrival time.

According to various, but not necessarily all, embodiments of the invention there is provided a system comprising the apparatus as defined above, and a route guidance computer, the route guidance computer comprising at least one processor; and at least one memory storing instructions that, when executed by the at least one processor, cause the route guidance computer at least to:

receive route parameters comprising the scheduled departure time and/or scheduled arrival time, and a path of the leg; and cause output of route guidance information in dependence on the route parameters.

According to various, but not necessarily all, embodiments of the invention there is provided a system comprising the apparatus as defined above, and a route guidance computer, the route guidance computer comprising at least one processor; and at least one memory storing instructions that, when executed by the at least one processor, cause the route guidance computer at least to:

receive route parameters comprising the scheduled departure time and/or scheduled arrival time, and a path of the leg;

receive information indicative of a current real-world position of the seaborne vessel; and cause output of real-time route guidance information in dependence on the route parameters and the information indicative of the current real-world position.

According to various, but not necessarily all, embodiments of the invention there is provided a method or computer-implemented method comprising sailing the seaborne vessel along the leg, comprising departing a departure node of the leg at the scheduled departure time, and/or controlling a speed of the seaborne vessel to arrive at an arrival node of the leg at the scheduled arrival time.

According to various, but not necessarily all, embodiments of the invention there is provided a non-transitory computer readable medium comprising instructions that, when executed by an apparatus or the system, cause the apparatus or system to perform:

receiving information indicative of a preliminary departure time and a preliminary arrival time, of a leg of a route of a seaborne vessel;

receiving information indicative of an energy consumption rate of the seaborne vessel;

determining at least one of a scheduled departure time different than the preliminary departure time, or a scheduled arrival time different than the preliminary arrival time, in dependence on the information indicative of an energy consumption rate of the seaborne vessel; and modifying the preliminary departure time to the scheduled departure time, in memory, and/or modifying the preliminary arrival time to the scheduled arrival time, in memory.

The below statements relate to a bearing range method, which may be claimed separately or together with the departure/arrival time method of the preceding statements.

According to various, but not necessarily all, embodiments of the invention there is provided an apparatus comprising: at least one processor; and at least one memory storing instructions that, when executed by the at least one processor, cause the apparatus at least to perform:

receiving information indicative of at least one of a first geographical region or a first node, and information indicative of at least one of a second geographical region or a second node;

determining a bearing between the first geographical region or first node, and the second geographical region or second node;

determining a bearing range from a reference geographical position in dependence on the determined bearing, the bearing range having an angular width, wherein the bearing range aims from the first geographical region or first node towards the second geographical region or second node;

determining a set of candidate nodes for adding to the route from a dataset of nodes, in dependence on which of the nodes are within the determined bearing range;

selecting a node from the set of candidate nodes, in dependence on one or more route constraints other than the bearing range; and setting the selected node as part of the route, in the at least one memory.

A first advantage is reducing an energy consumption of the route. By prohibiting the selection of candidate nodes outside the bearing range, U-turns are inhibited to keep the seaborne vessel sailing in predominantly in a required direction, for example from the first geographical region (e.g., Caribbean) towards the second geographical region (e.g., Mediterranean). This reduces the overall path length of the route, to reduce energy consumption. A second advantage is computational efficiency when calculating potential routes. The dataset of nodes may comprise hundreds or thousands of nodes, or more. The maximum number of possible paths of the routes would therefore be computationally-infeasible to calculate and would involve sailing over very long distances, unless constraints are provided. The bearing range filters down the number of selectable candidate nodes to those which are within the bearing range. Other constraints further filter down the selectable candidate nodes. Since there are fewer selectable nodes for the leg, the maximum number of possible routes is significantly reduced, making the maximum number of possible paths of the routes computationally-feasible to calculate.

Optionally, the bearing is a predetermined bearing or a calculated bearing.

Optionally, determining the bearing range comprises determining the angular width of the bearing range. Optionally, the angular width is a predetermined angular width or a calculated angular width. Optionally, determining the angular width comprises receiving a user-inputted angular width, based on information received from a user interface device. Optionally, determining the angular width is dependent on the information and/or at least one of the route constraints. Optionally, the angular width is dependent on at least one indicator of a distance of at least part of the route, and/or is dependent on which leg of the route the set of candidate nodes are to be determined for. Optionally, the at least one indicator of the distance of at least part of the route comprises at least one of:

a number of geographical regions and/or nodes that the route is required to pass through, the number being a variable;

whether the route is a closed loop route or an open jaw route, both options being possible for the route; or a separation between nodes and/or geographical regions that the route is required to pass through, the separation being a variable.

An advantage is that the bearing range can be widened or narrowed to co-optimize route flexibility, energy consumption of the seaborne vessel, and computational efficiency. In a first example, if the route is required to intersect more regions/nodes, the bearing range may be narrowed to ensure the legs follow a less meandering path. If the regions/nodes that the route must intersect are far apart, the bearing range may be narrower. Furthermore, the bearing range may be wider/not used for a leg to or from a 'must include' node/region, such as a home port or a 'must include' way port. For example, this allows a port at the edge of a region to be set as the home port, without forcing the seaborne vessel to immediately exit the region in its first leg. For example, a route from the Mediterranean to the Caribbean with Lisbon as the home port could be allowed to sail to Gibraltar on the first leg, which is in the opposite direction than the Caribbean. However, subsequent legs may need to follow the bearing constraint, aiming towards the Caribbean.

Optionally, the angular width of the bearing range is no more than 180 degrees to prevent the set of candidate nodes from requiring a U-turn of the route, or no more than 225 degrees or no more than 270 degrees. Either way, a 180-degree U-turn is prevented.

Optionally, the instructions, when executed by the at least one processor, cause the apparatus at least to perform:

determining whether the set of candidate nodes comprises a number of candidate nodes within the bearing range below a threshold;

modifying the bearing range in dependence on the number of candidate nodes within the bearing range being below the threshold, wherein modifying the bearing range comprises widening the angular width and/or rotating the bearing range; and in dependence on the number of candidate nodes within the bearing range being above the threshold, determining the set of candidate nodes for adding to the route from the dataset of nodes, in dependence on which of the nodes are within the modified bearing range.

An advantage is co-optimizing route flexibility and computational efficiency. Although a narrower bearing range substantially increases computational efficiency by reducing the number of candidate nodes and maximum possible number of routes, it could lead to a situation such as 'sailing West from Lisbon', for which zero candidate nodes may exist within the bearing range and other constraints (e.g., consecutive sea days limit for the leg, and/or cumulative sea days limit for the route). Therefore, if insufficient candidate nodes are found, the bearing range could be widened. In the Lisbon example, the bearing range could be widened to greater than 180 degrees to allow the seaborne vessel to sail up or down the coast of Portugal, or start heading back towards Spain.

Optionally, the instructions, when executed by the at least one processor, cause the apparatus at least to perform:

determining information indicative of a distance of at least part of the route;

in dependence on the information indicative of the distance satisfying a condition associated with distance, determining the bearing, determining the bearing range, and determining the set of candidate nodes in dependence on which of the nodes are within the determined bearing range, wherein the angular width of the bearing range is less than a first angular width from the reference geographical position, the first angular width being a value of up to 360 degrees; and in dependence on the information indicative of the distance not satisfying the condition associated with distance, selecting nodes from the dataset of nodes within the first angular width (e.g., 360 degrees) around the reference geographical position, in dependence on the one or more route constraints other than the bearing range.

Optionally, the information indicative of a distance of at least part of the route comprises at least one of:

a number of geographical regions and/or nodes that the route is required to pass through;

whether the route is a closed loop route or an open jaw route; or a separation between nodes and/or geographical regions that the route is required to pass through.

An advantage is co-optimizing route flexibility, energy consumption of the seaborne vessel, and computational efficiency. For example, the information may be indicative that the route is within a single region (e.g., Mediterranean). This indicates a smaller number of nodes, and short distances between all possible node pairs. Therefore, the bearing range may not be needed at all, or can be widened. However, if the information indicates that the route is required to intersect multiple regions, a bearing range of less than 360 degrees may be used. This avoids excessively long or meandering paths, with U-turns.

Optionally, the instructions, when executed by the at least one processor, cause the apparatus at least to perform:

- determining which leg of the route the set of candidate nodes are to be determined for;
- in dependence on the leg being a first value, determining the bearing range, and determining the set of candidate nodes in dependence on which of the nodes are within the determined bearing range, wherein the angular width of the bearing range is less than a first angular width from the reference geographical position; and
- in dependence on the leg being a second value, determining the set of candidate nodes within the first angular width around the reference geographical position.

An advantage is that the bearing range can be widened or narrowed to co-optimize route flexibility, energy consumption of the seaborne vessel, and computational efficiency. For example, the bearing range may be wider/not used for a leg to or from a 'must include' node/region, such as a home port or a 'must include' way port. For example, this allows a port at the edge of a region to be set as the home port, without forcing the seaborne vessel to immediately exit the region in its first leg. For example, a route from the Mediterranean to the Caribbean with Lisbon as the home port could be allowed to sail to Gibraltar on the first leg, which is in the opposite direction than the Caribbean. However, subsequent legs may need to follow the bearing constraint, aiming towards the Caribbean.

Optionally, the one or more route constraints other than the bearing range comprise at least one of:

- a requirement that the route is unique compared to already-calculated routes;
- a departure time (e.g., departure time request/depart after time);
- an arrival time (e.g., arrival time request/arrive before time);
- one or more sea days requirements (e.g., consecutive sea days limit for the leg, and/or cumulative sea days limit for the route);
- a set of one or more required geographical regions to include and/or exclude (e.g., 'must include' regions/ 'must exclude' regions);
- a set of one or more required nodes to include and/or exclude (e.g., 'must include' nodes/'must exclude' nodes); or
- one or more speed constraints (e.g., minimum speed and/or maximum speed). Optionally, at least one of the route constraints is at least partially user-inputted/ received from a user interface device.

An advantage is further optimizing energy consumption of the seaborne vessel, as well as computational efficiency. A minimum and maximum distance/radius from the departure node of each leg is implied by the departure time, arrival time, sea days requirements, and speed constraints. Therefore, both distance and direction are taken into account. This substantially reduces the number of selectable nodes within the bearing range, to eliminate nodes which are very far away, or too close. This substantially reduces the time to calculate the maximum number of possible routes, and also reduces energy consumption by avoiding very long hops or slow cruise speeds. Furthermore, the 'must include'/'must exclude' regions/nodes, and sea days limits, reduce the number of unknown nodes of the route, which substantially reduces the time to calculate the maximum number of possible routes. For instance, a seven day route with up to two consecutive sea days, and two must-include nodes, may account for three of the seven days. Therefore, nodes only need to be selected for four more days, which reduces the number of possible route permutations by many orders of magnitude.

Optionally, the reference geographical position is a position of at least one of: a home port of the route; the first node; or the first geographical region.

Optionally, the first geographical region or first node is associated with a first continent, and wherein the second geographical region or second node is associated with a second continent different from the first continent. The bearing range may be used at least when crossing between continents.

Optionally, the 'geographical regions' are continents, seas, or oceans, or predetermined node clusters. Optionally, each geographical region comprises a plurality of the nodes. Optionally, the dataset of nodes comprises metadata associating the nodes with geographical regions.

According to various, but not necessarily all, embodiments of the invention there is provided a system comprising the apparatus as defined above, and a route guidance computer, the route guidance computer comprising at least one processor; and at least one memory storing instructions that, when executed by the at least one processor, cause the route guidance computer at least to:

- receive the route, including the selected node or a plurality of the selected nodes; and
- cause output of route guidance information in dependence on the route.

According to various, but not necessarily all, embodiments of the invention there is provided a system comprising the apparatus as defined above, and a route guidance computer, the route guidance computer comprising at least one processor; and at least one memory storing instructions that, when executed by the at least one processor, cause the route guidance computer at least to:

- receive the route, including the selected node or a plurality of the selected nodes;
- receive information indicative of a current real-world position of the seaborne vessel; and
- cause output of real-time route guidance information in dependence on the route and the information indicative of the current real-world position.

According to various, but not necessarily all, embodiments of the invention there is provided a method or computer-implemented method comprising sailing the seaborne vessel along the route, including the selected nodes.

According to various, but not necessarily all, embodiments of the invention there is provided a non-transitory computer readable medium comprising instructions that, when executed by an apparatus or the system, cause the apparatus or system to perform:

- receiving information indicative of at least one of a first geographical region or a first node, and information indicative of at least one of a second geographical region or a second node;

- determining a bearing between the first geographical region or first node, and the second geographical region or second node;
- determining a bearing range from a reference geographical position in dependence on the determined bearing, the bearing range having an angular width, wherein the bearing range aims from the first geographical region or first node towards the second geographical region or second node;
- determining a set of candidate nodes for adding to the route from a dataset of nodes, in dependence on which of the nodes are within the determined bearing range;
- selecting a node from the set of candidate nodes, in dependence on one or more route constraints other than the bearing range; and
- setting the selected node as part of the route, in the at least one memory.

The below statements relate to a candidate route determination method, which may be claimed separately or together with the methods of the preceding statements.

According to various, but not necessarily all, embodiments of the invention there is provided an apparatus comprising: at least one processor; and at least one memory storing instructions that, when executed by the at least one processor, cause the apparatus at least to perform:

- receiving route constraints for determining a plurality of candidate routes for a seaborne vessel from a dataset of nodes; and
- determining the plurality of candidate routes, comprising, for each candidate route, selecting nodes for adding to the candidate route from the dataset of nodes, in dependence on the route constraints, and setting the selected nodes as part of the candidate route; and
- storing the candidate routes in the at least one memory;

wherein the route constraints comprise at least one of:

- one or more location requirements setting one or more required nodes to include and/or exclude, and/or one or more required geographical regions to include and/or exclude;
- one or more sea days requirements (e.g., consecutive sea days limit for the leg, and/or cumulative sea days limit for the route);
- one or more range constraints indicative of at least one of a departure time, an arrival time, or a speed constraint (e.g., departure time request/depart after time, arrival time request/arrive before time, minimum speed, maximum speed); or
- one or more direction constraints controlling a range of directions allowed for a leg of the route (e.g., bearing range).

An advantage is a computationally-efficient way of automatically determining low-energy-consumption routes. The dataset of nodes may comprise hundreds or thousands of nodes, allowing at least billions of route permutations. The constraints filter down the number of legs that can go to multiple different nodes, and filter down the number of selectable candidate nodes for each leg. These constraints reduce the maximum number of possible routes by very many orders of magnitude, allowing a computationally feasible way of calculating energy-efficient routes. Therefore, there is a higher degree of confidence that the determined candidate routes represent the lowest possible energy consumption, out of all the possible route permutations. Due to the size of the dataset, humans could not credibly perform this calculation and identify the routes with the lowest energy consumption. Humans may be able to find routes with a low energy consumption, but the above computer-implemented method can identify the maximum number of unique routes within the constraints, to find the route with the minimum energy consumption, of all possible unique routes.

According to various, but not necessarily all, embodiments of the invention there is provided a non-transitory computer readable medium comprising instructions that, when executed by an apparatus or the system, cause the apparatus or system to perform:

- receiving route constraints for determining a plurality of candidate routes for a seaborne vessel from a dataset of nodes;
- determining the plurality of candidate routes, comprising, for each candidate route, selecting nodes for adding to the candidate route from the dataset of nodes, in dependence on the route constraints, and setting the selected nodes as part of the candidate route; and
- storing the candidate routes in the at least one memory;

wherein the route constraints comprise at least one of:

- one or more location requirements setting one or more required nodes to include and/or exclude, and/or one or more required geographical regions to include and/or exclude;
- one or more sea days requirements (e.g., consecutive sea days limit for the leg, and/or cumulative sea days limit for the route);
- one or more range constraints indicative of at least one of a departure time, an arrival time, or a speed constraint (e.g., departure time request/depart after time, arrival time request/arrive before time, minimum speed, maximum speed); or
- one or more direction constraints controlling a range of directions allowed for a leg of the route (e.g., bearing range).

While the examples of the disclosure and optional features are described separately, it is to be understood that their provision in all possible combinations and permutations is contained within the disclosure. It is to be understood that various examples of the disclosure can comprise any or all the features described in respect of other examples of the disclosure, and vice versa. Also, it is to be appreciated that any one or more or all the features, in any combination, may be implemented by/comprised in/performable by an apparatus, a method, and/or instructions as desired, and as appropriate. The description of a function should additionally be considered to also disclose any means suitable for performing that function.

BRIEF DESCRIPTION

Figure 1B:
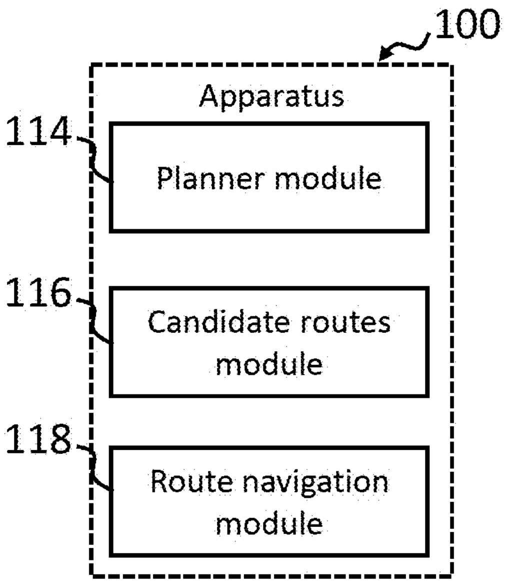
Figure 1C:
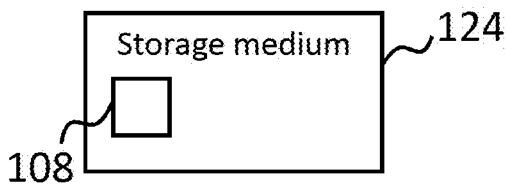
Figures 2A, 2B:
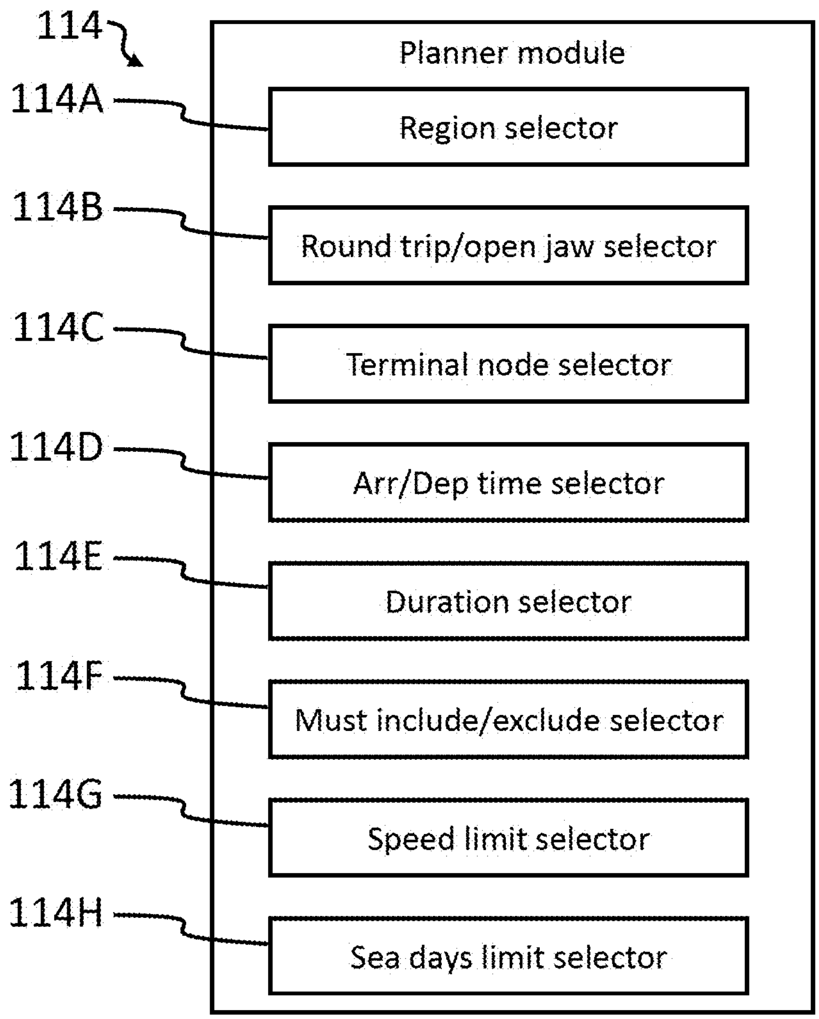
Figure 3A:
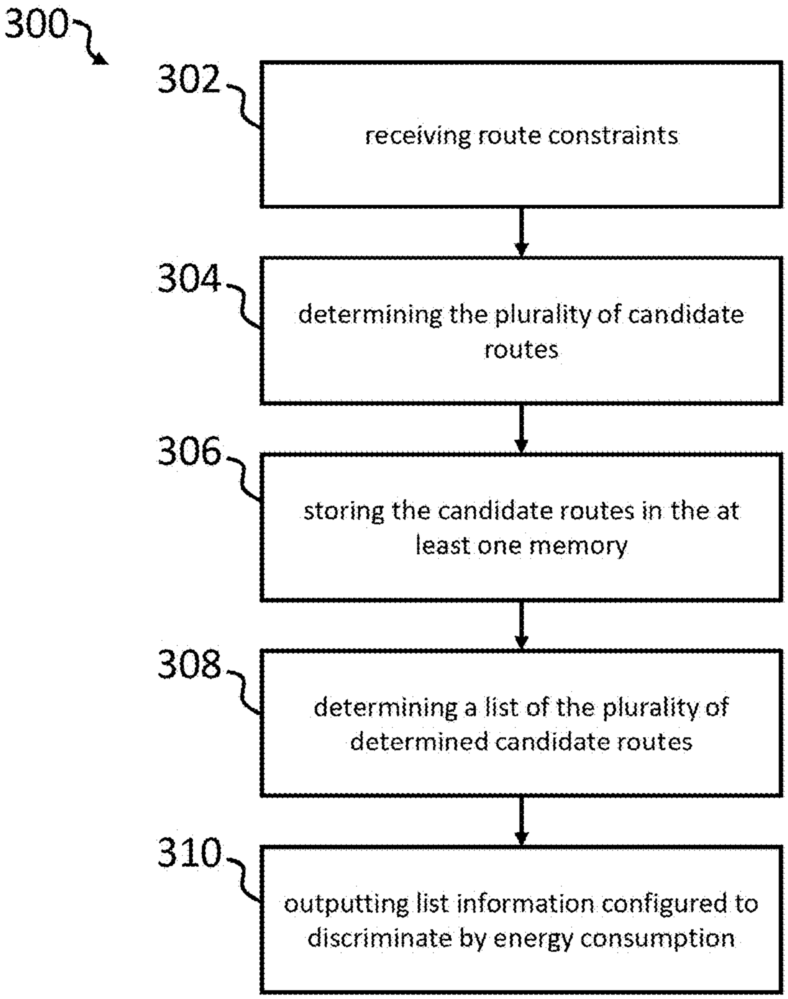
Figure 3B:
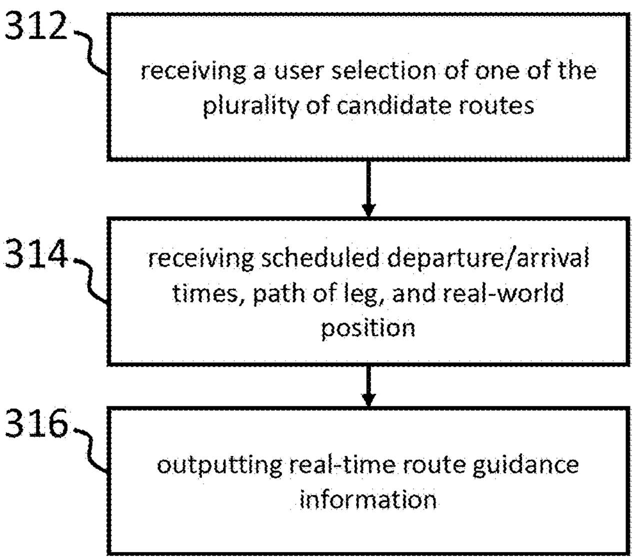
Figure 4A:
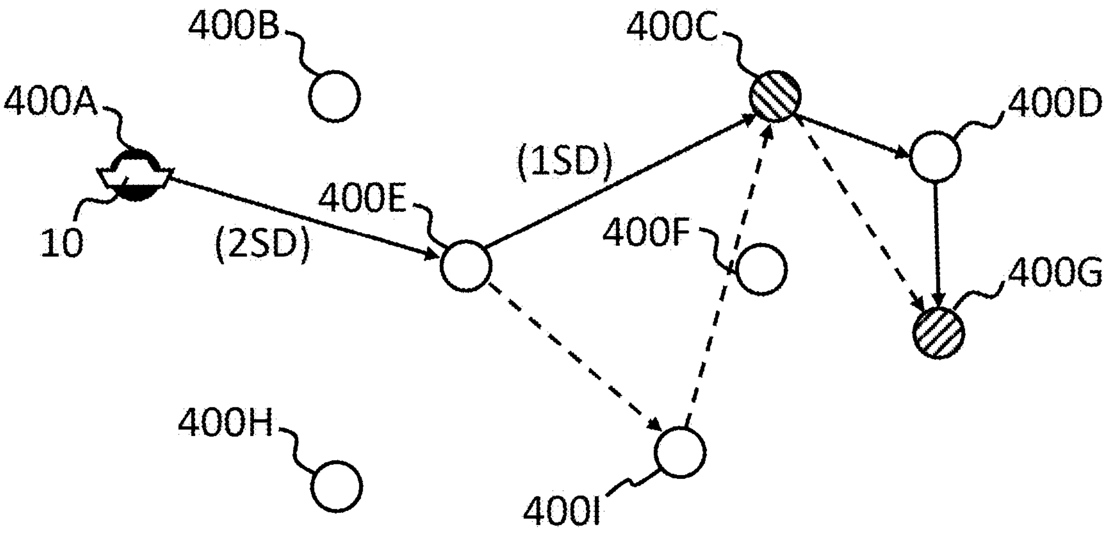
Figure 4B:
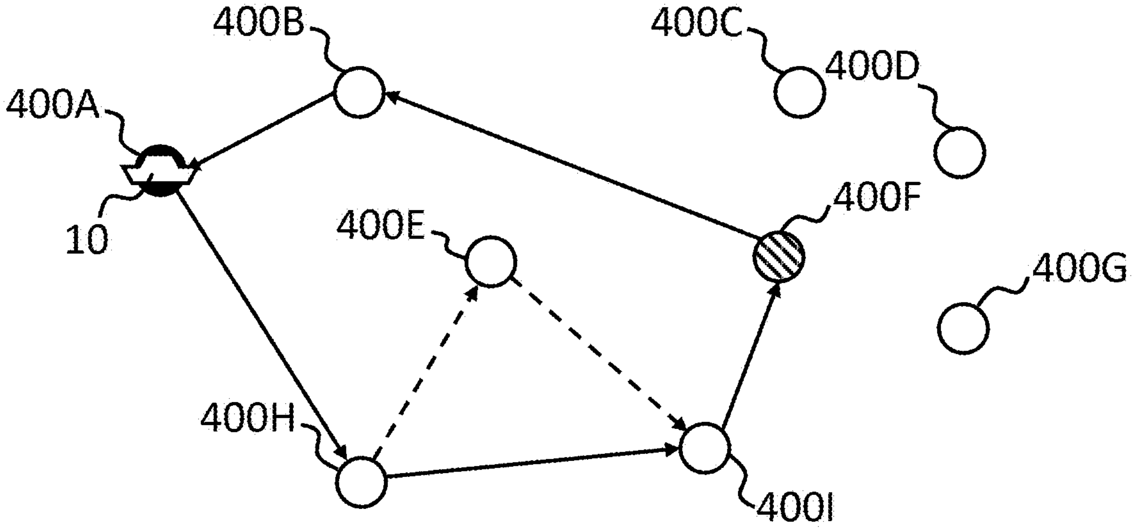
Figure 5:
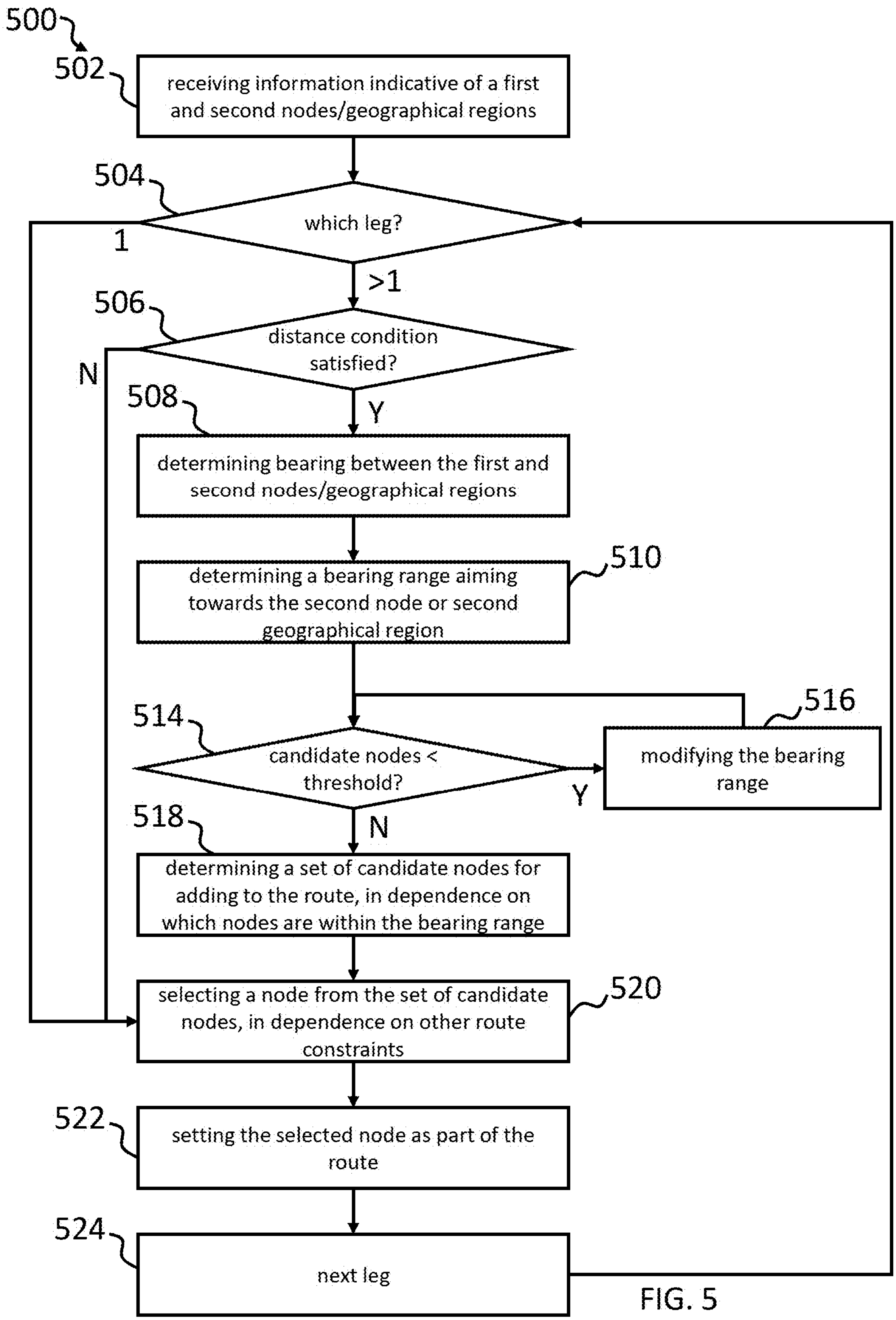
Figure 6A:
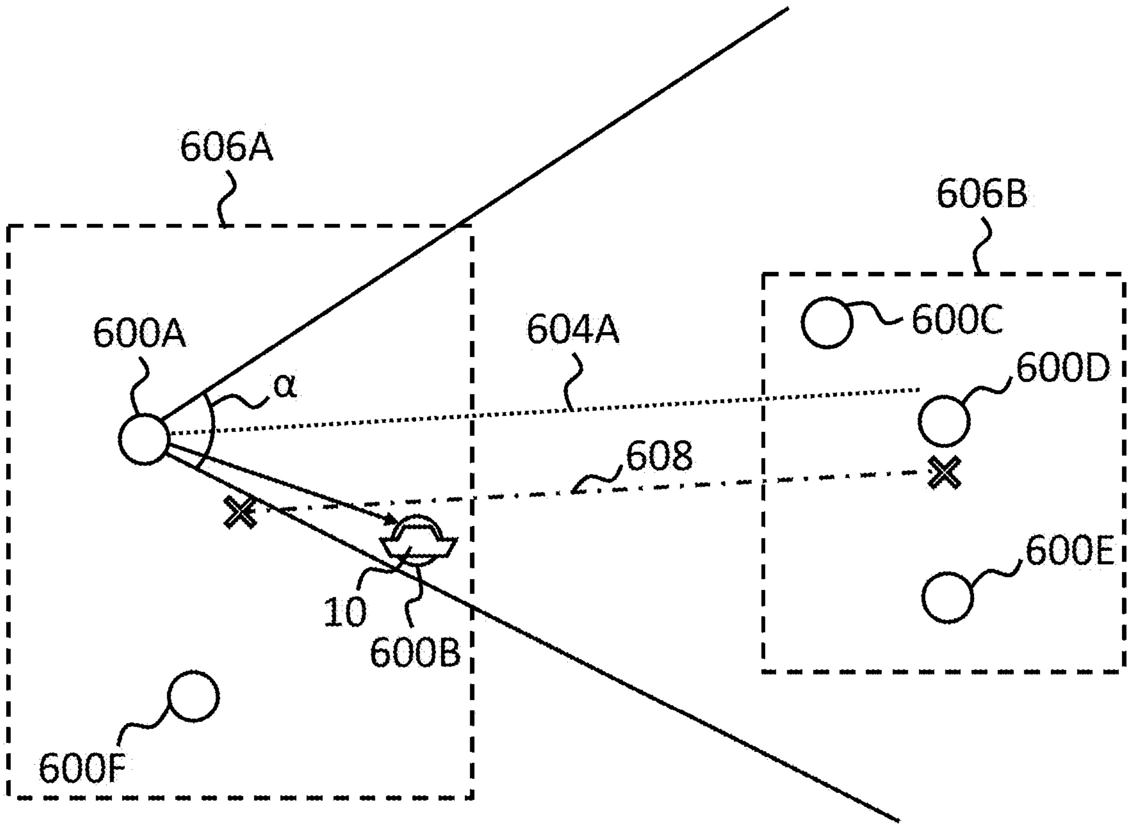
Figure 6B:
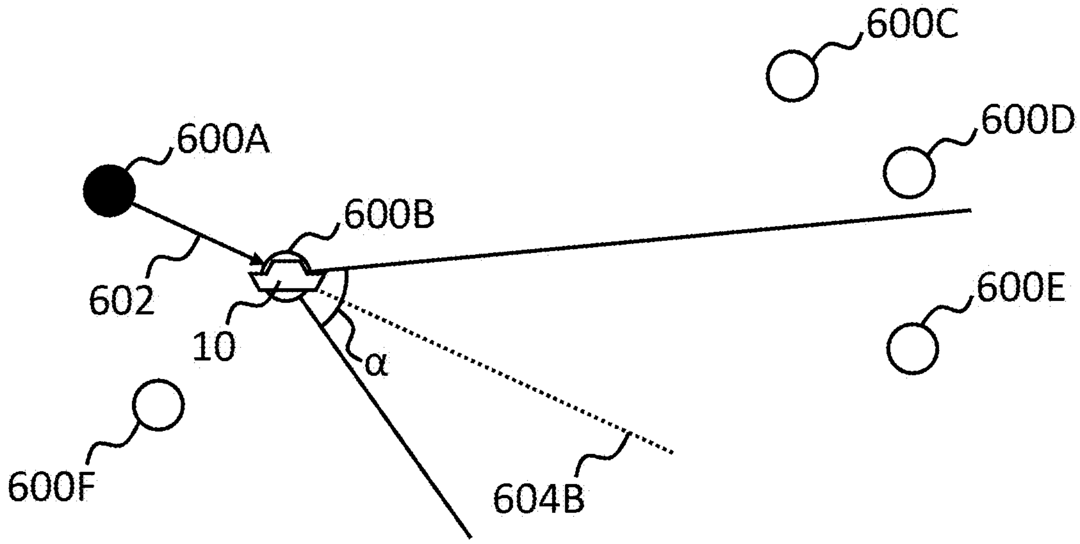
Figure 7:
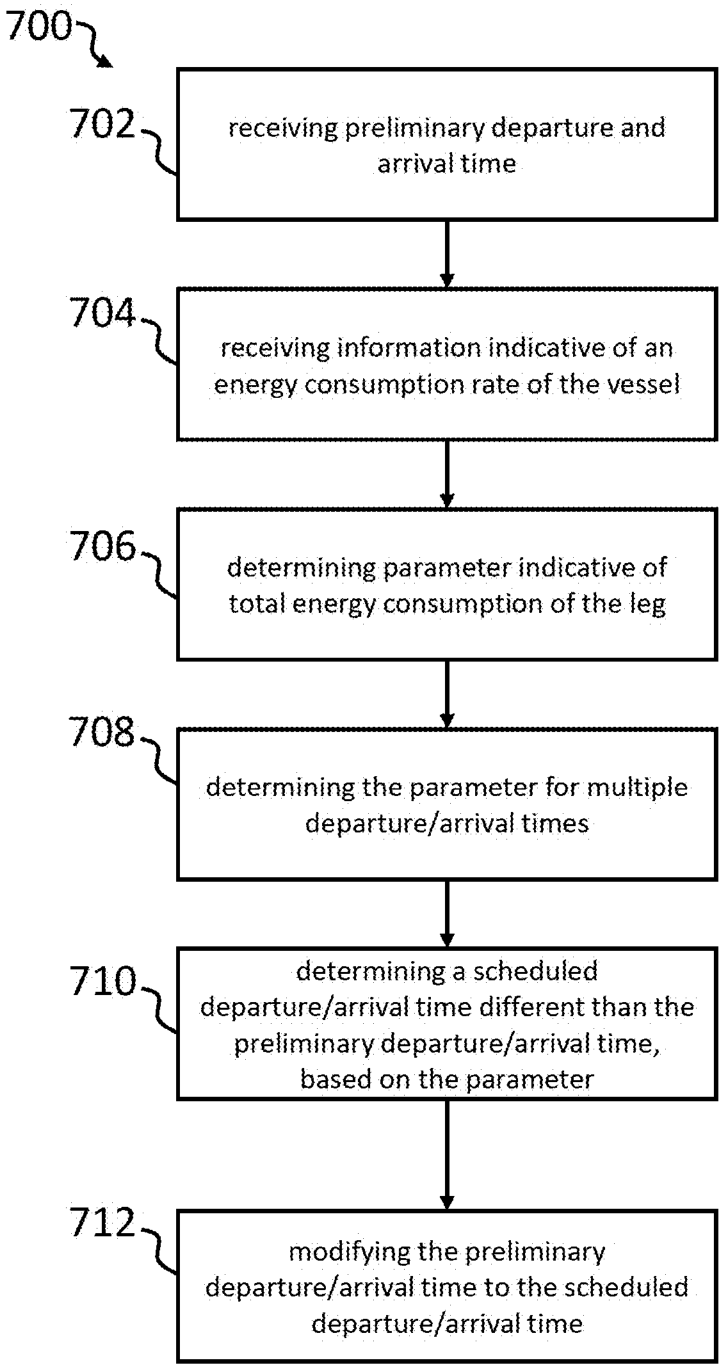
Figure 8A:
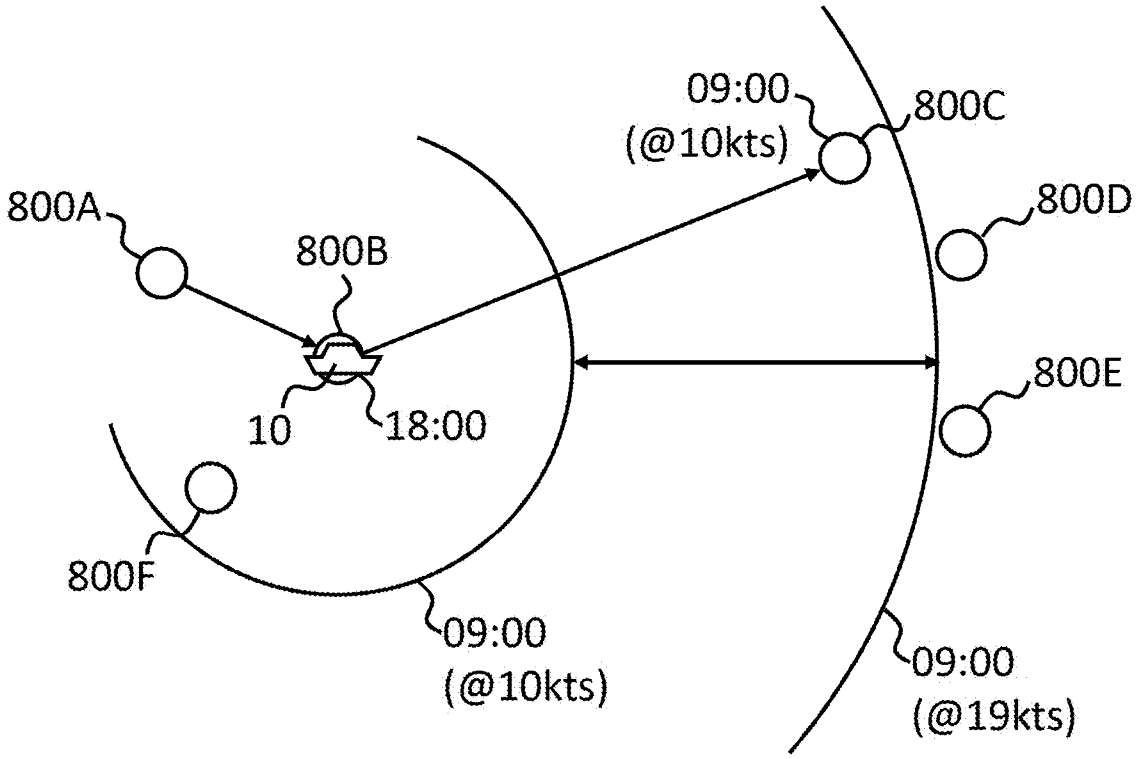
Figure 8B:
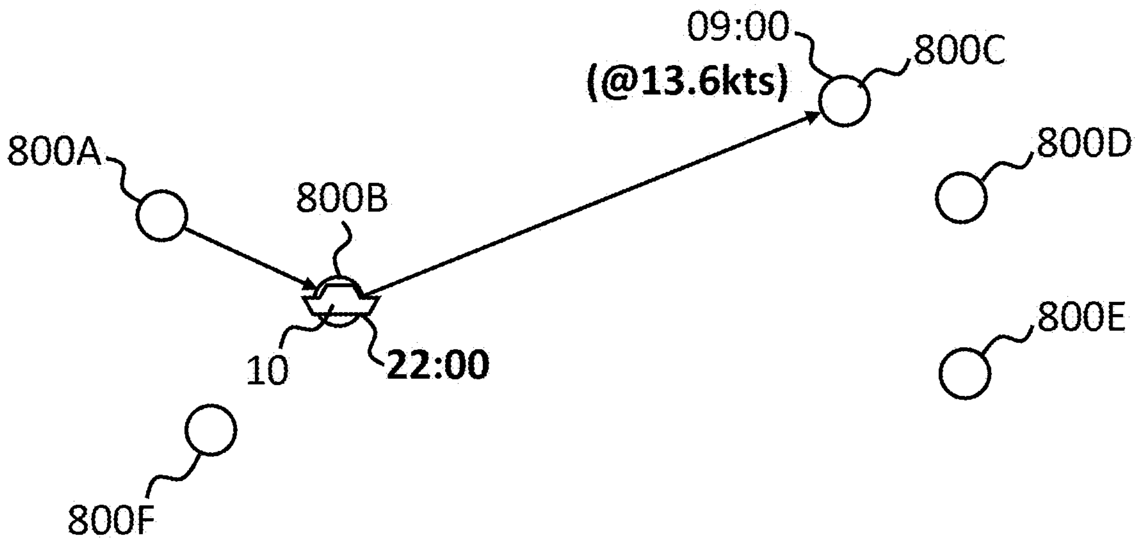
Figure 9A:
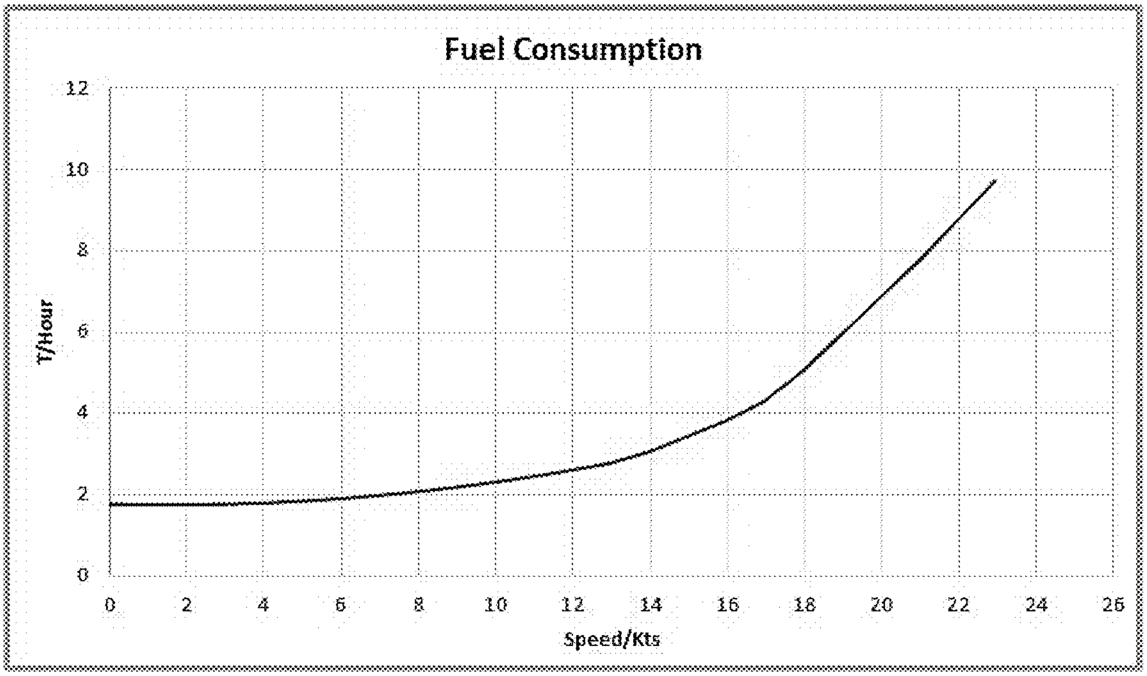
Figure 9B:
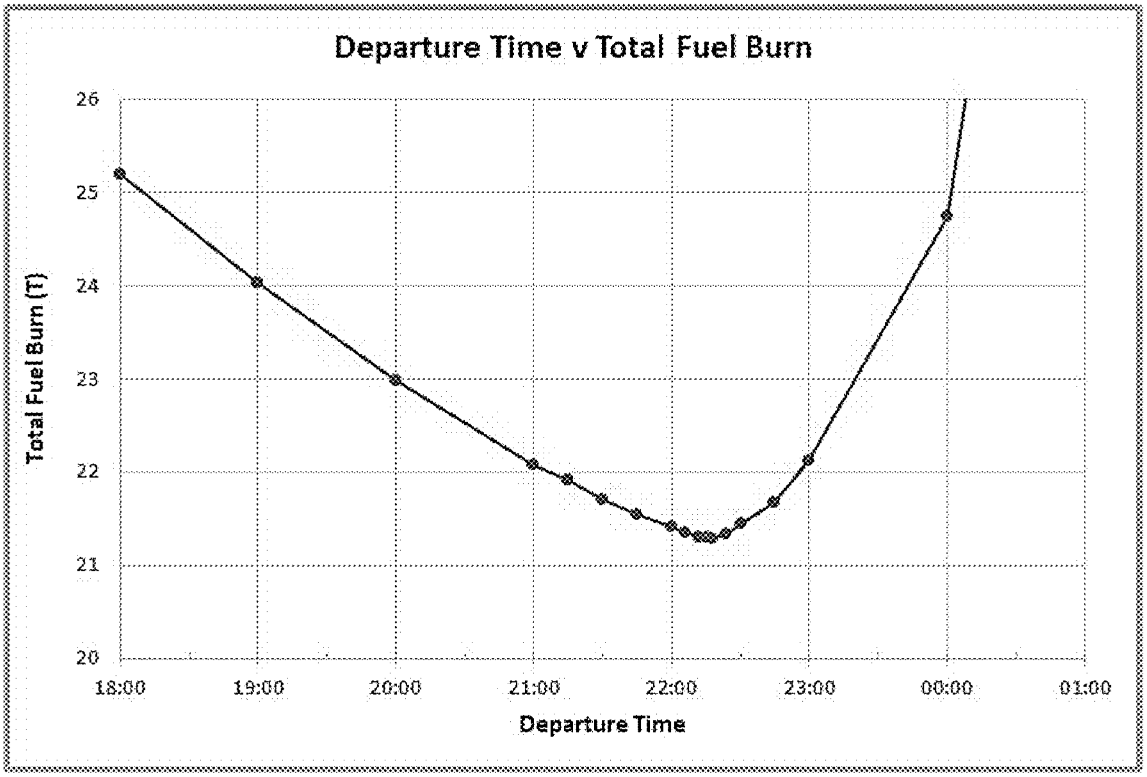

Some examples will now be described with reference to the accompanying drawings in which:

FIG. 1A shows an example of an apparatus, FIG. 1B shows an example of modules of the apparatus, and FIG. 1C shows an example of a non-transitory computer-readable storage medium comprising instructions;

FIG. 2A schematically illustrates a planner module for entering route constraints;

FIG. 2B schematically illustrates a graphical user interface rendered by a candidate routes module, enabling selection of one of a plurality of candidate routes; and FIG. 2C schematically illustrates a graphical user interface rendered by a route navigation module, displaying route parameters for a selected route;

FIG. 3A is a flowchart illustrating an example computer-implemented method of determining candidate routes, and FIG. 3B is a flowchart illustrating an example computer-implemented method of outputting real-time route guidance information;

FIG. 4A schematically illustrates a node map demonstrating example open jaw routes, and FIG. 4B schematically illustrates a node map demonstrating example round trip routes;

FIG. 5 is a flowchart illustrating an example computer-implemented method of determining candidate nodes for a route in dependence on a bearing range;

FIG. 6A schematically illustrates a node map demonstrating a first example method of determining a bearing range, and FIG. 6B schematically illustrates a node map demonstrating a second example method of determining a bearing range;

FIG. 7 is a flowchart illustrating an example computer-implemented method of determining a scheduled departure time and/or a scheduled arrival time, in dependence on information indicative of an energy consumption rate of a seaborne vessel; and FIG. 8A schematically illustrates a node map demonstrating a leg of a route as well as minimum and maximum distances for the leg based on a preliminary departure time and preliminary arrival time, and FIG. 8B schematically illustrates a node map demonstrating changing the departure time and arrival time to reduce total energy consumption;

FIG. 9A illustrates a graph of energy consumption rate with respect to speed, and FIG. 9B illustrates a graph of total energy consumption with respect to departure time.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

DETAILED DESCRIPTION

The figures illustrate an apparatus 100, a system 1, and a seaborne vessel 10.

FIG. 1A shows an example of an apparatus 100 for performing most of the operations described herein, except where otherwise specified. The apparatus 100 may comprise a controller 101 (computer). The controller 101 comprises at least one processor 106; and at least one memory 104 storing instructions 108 that, when executed by the at least one processor 106, cause the apparatus 100 at least to perform the operations described herein. The apparatus 100 also comprises at least one interface 102 via which data and/or commands are output by the processor 106, and via which data and/or commands are input to the processor 106. The apparatus 100 may be off-board or on-board the seaborne vessel 10.

FIG. 1A also illustrates an optional route guidance computer 122 on board the seaborne vessel 10. FIG. 1A also illustrates an optional user interface device 120 ('UID'). The apparatus 100, and the route guidance computer 122 and/or user interface device 120 may together form a system 1.

The optional route guidance computer 122 is configured to display route guidance information. The route guidance computer 122 may comprise the same type of architecture as the illustrated controller 101. The controller 101 may be a server-end controller, and the route guidance computer 122 may be a client-end computer.

In another example, a client-server model is not used. The apparatus 100 may comprise the route guidance computer 122. The controller 101 of FIG. 1A may be configured to implement the functionality of the route guidance computer 122.

The user interface device 120 is configured to allow a user to interact with the apparatus 100 or system 1. The user interface device 120 may be configured to render a graphical user interface, and one or more input devices such as a mouse, touchpad, keyboard, touchscreen, or a combination thereof. The user interface device 120 may be part of a same device (e.g., handheld computer, desktop computer, laptop computer) as the controller 101, or may be part of a separate device. In one example, the controller 101 is a server-end controller, and the user interface device 120 is comprised in a client-end computer, configured to communicate with the controller 101 by client-server communication.

In another example, a client-server model is not used for the user interface device 120. The apparatus 100 may comprise the user interface device 120.

The route guidance computer 122 may comprise a separate user interface device, or may be operably coupled to the illustrated user interface device 120.

FIG. 1B shows an example of modules of the apparatus 100. The modules comprise a planner module 114, a candidate routes module 116, and a route navigation module 118, for example. The modules may be implemented as instructions 108, program, or code of the apparatus 100 or system 1.

In examples, the planner module 114 of FIG. 1B is configured to control the user interface device 120 to render one or more graphical user interfaces in the form of one or more selectors 114A-114H shown in FIG. 2A. The selectors of FIG. 2A are described in more detail later. Each selector 114A-114H comprises a corresponding input field configured to allow a user to configure the apparatus 100 or system 1 via the one or more input devices, to perform the operations described herein. For example, each selector may allow the user to input one or more route constraints, which are later used in the determination of one or more candidate routes. Any appropriate input fields may be implemented, including text boxes, drop-down menus, buttons, sliders, etc.

Furthermore, the planner module 114 of FIG. 1B is configured to determine one or more candidate routes between nodes from a dataset of nodes, in dependence on the one or more route constraints. The dataset of nodes may comprise ports, which are schematically shown in FIGS. 4A-4B, FIGS. 6A-6B, and FIGS. 8A-8B.

In examples, the planner module 114 of FIG. 1B is configured to receive a plurality of the route constraints, and therefore may be configured to determine the maximum number of possible candidate routes. The dataset of nodes may comprise dozens, hundreds, or thousands of nodes. Therefore, the maximum number of route permutations may be incalculable if not for the route constraints. With enough route constraints, determining the maximum number of possible routes becomes computationally possible despite the large dataset of nodes.

In examples, the candidate routes module 116 of FIG. 1B is configured to receive the plurality of candidate routes from the planner module 114, and in response determine a list of the plurality of candidate routes. Individual entries in the list may comprise a corresponding unique one of the candidate routes. Alternatively, or additionally, individual entries in the list may comprise a set of multiple candidate routes.

The candidate routes module 116 may be configured to control the same user interface device 120, or a different user interface device, to render one or more graphical user interfaces comprising the list of the candidate routes as shown in FIG. 2B. The list of candidate routes is described in more detail later.

In examples, the route navigation module 118 of FIG. 1B is configured to receive information indicative of a user selected route or set of routes, selected from the list of candidate routes of FIG. 2B. The route navigation module 118 is configured to receive route parameters of the user selected route or set of routes, such as a date of arrival at each node, the arrival time at each node, the departure time from each node, the speed of each leg, the fuel used for each leg, or a combination thereof. The route parameters may have been determined by the planner module 114 and/or by the candidate routes module 116.

It would be appreciated that some of the above-described functions of the modules could be performed by other modules than the ones described above. Furthermore, the functions of one or more of the modules could be shared.

In some, but not necessarily all examples, the route navigation module 118 is configured to send the user selected route, including the route parameters, to the optional route guidance computer 122. The route guidance computer 122 may also be configured to receive information indicative of a current real-world position of the seaborne vessel 10. The information may be sensed position information or user input location information.

The optional route guidance computer 122 may be configured to cause output of real-time route guidance information in dependence on the route parameters and the information indicative of the current real-world position. The real-time route guidance information may comprise alerts to prompt the captain to stay within the route parameters, and/or may comprise path navigation instructions.

FIG. 1C shows an example of a non-transitory computer-readable storage medium 124 comprising instructions 108.

FIG. 2A schematically illustrates selectors 114A-114H of the planner module 114. Each selector 114A-114H may be rendered by the user interface device 120 as a corresponding graphical user interface. The selectors 114A-114H are configured to receive user inputs to configure route constraints. The route constraints are used in the determination of the candidate routes.

In some examples, one of the selectors comprises a region selector 114A. In some examples, the region selector 114A is configured to allow the user to input route constraints comprising a set of one or more required geographical regions to include when determining the candidate routes.

The geographical regions represent predetermined non-overlapping node clusters. A node can only belong to one geographical region. Each geographical region comprises a plurality of nodes. Each geographical region may comprise ports (nodes) from multiple countries. The geographical regions may be indicative of different continents, portions of continents, seas, oceans, or a combination thereof. Optionally, each geographical region comprises a plurality of the nodes. Optionally, the dataset of nodes comprises metadata associating the nodes with the geographical regions.

In some examples, the region selector 114A is configured to allow the user to input one or more route constraints comprising a set of one or more required geographical regions to exclude when determining the candidate routes. This set defines a blacklist.

In some implementations, the region selector 114A renders a selectable list of geographical regions to the user, and user inputs may select some of the geographical regions and not select/deselect the other geographical regions. The selected geographical regions are determined as 'must include' route constraints. The non-selected/de-selected geographical regions may be optionally used for the final route, or may be determined as 'must exclude' route constraints.

If a single geographical region is selected, the route will stay within a single geographical region. If multiple geographical regions are selected, the route will include nodes from the multiple selected geographical regions.

In some examples, one of the selectors comprises a round trip/open jaw selector 114B. The round trip/open jaw selector 114B is configured to allow the user to input a route constraint defining whether the route is going to be a round trip or an open jaw route. A round trip begins and ends at the same port. An open jaw route begins and ends at different ports.

FIG. 4A illustrates an example open jaw route, and FIG. 4B illustrates an example round trip route. They are described in more detail later.

In some examples, one of the selectors comprises a terminal node selector 114C for selecting one or more terminal nodes. A terminal node may comprise a start node and/or an end node, of the route.

In some examples, the terminal node selector 114C is configured to allow the user to input a route constraint defining a start node of the route. The start node may represent a home port. The route constraint defines the start node as a 'must include' node that must be set as the first node of the route.

If a round trip was selected, a further route constraint is automatically set, defining the start node as a 'must include' node that must be set as the last node of the route. Therefore, the seaborne vessel 10 will return to the home port.

If an open jaw route was selected, the terminal node selector 114C may be configured to allow the user to input a route constraint defining a last node of the route. The last node is different from the start node.

In some examples, one of the selectors comprises an arrival/departure time selector 114D. The arrival/departure time selector 114D is configured to allow the user to input a route constraint comprising a departure time request, and/or a route constraint comprising an arrival time request.

Optionally, the departure time request comprises a 'depart after time'. Optionally, the arrival time request comprises an 'arrive before time'. These may be default values for most or all legs of the route. When the planner module 114 is selecting an arrival node for a leg of a candidate route, the departure time request and arrival time request may cause the planner module 114 to prioritize or only consider nodes which can be reached when sailing no earlier than the 'depart after time' and arriving no later than the 'arrive before time'. The speed of the seaborne vessel 10 and number of sea days may be taken into account in this calculation, as predetermined assumptions or other user-defined route constraints.

In some examples, one of the selectors comprises a duration selector 114E. The duration selector 114E is configured to allow the user to input a route constraint comprising a duration of the route. The duration may indicate, at least in part, the number of days of the route. The number of days may indicate, at least in part, the maximum number of legs of the route. Each leg may take up one or more days. Some legs, or each leg may comprise overnight sailing.

For example, a seven-day duration may comprise up to seven 'slots' (days). One or more of the slots may be predetermined/filled by other route constraint(s). For example, a node(s) from the terminal node selector 114C may fill the first slot and/or last slot. One or more slots may be sea days. The planner module 114 is configured to select nodes for the unfilled slots, when determining the candidate routes. It would be appreciated that a longer duration significantly increases the number of permutations of routes.

In some examples, one of the selectors comprises a must include/exclude selector 114F. The must include/exclude selector 114F is configured to allow the user to input one or more route constraints comprising a set of one or more required nodes to include when determining the candidate routes. This defines a set of one or more 'must include' nodes. The planner module 114 may be configured to place the 'must include' node(s) in any arbitrary one(s) of the unfilled slots.

In some examples, the must include/exclude selector 114F is configured to allow the user to input one or more route constraints comprising a set of one or more required geographical regions to exclude when determining the candidate routes. This defines a set of one or more 'must exclude' nodes.

In some implementations, the must include/exclude selector 114F is configured to only allow 'must include' nodes to be selected if they are within the one or more geographical regions selected via the region selector 114A. For example, the must include/exclude selector 114F may cause rendering of a selectable list of nodes within the selected geographical region(s) to the user, so that the user is only capable of selecting 'must include' nodes that are located in the selected geographical region(s).

In some examples, one of the selectors comprises a speed limit selector 114G. The speed limit selector 114G is configured to allow the user to input a route constraint comprising a maximum speed, and/or a route constraint comprising a minimum speed. That is, maximum and minimum speeds that the seaborne vessel 10 is allowed to sail at, when completing a leg of the route. The speed limits, in combination with the departure and arrival time requests, effectively define an annular zone around the departure node of a leg, preventing the selection of arrival nodes that are too close or too far away from the departure node. The greater the difference between the minimum and maximum speeds, the larger the annular zone is.

In some examples, one of the selectors comprises a sea days limit selector 114H. The sea days limit selector 114H is configured to allow the user to input one or more route constraints defining sea days requirements. A sea day is defined as an entire day spent at sea.

The sea days requirements may comprise one or more sea days time limits, for example. One example of a sea days time limit is a consecutive sea days limit. The consecutive sea days limit defines how many days in a row can be spent at sea. The value may be zero or more. A typical value may be from the range 0 to 2 days. Another example of a sea days time limit is a cumulative sea days limit. The cumulative sea days limit defines how many days of the overall route are spent at sea, whether consecutive or not.

In some examples, the sea days limit selector 114H may allow the user to input a route constraint defining a minimum number of sea days, such as a 'Yes/No' input for requiring a sea day after the start node of the route.

Overall, the selectors defined above significantly reduce the number of possible route permutations, making it computationally feasible for the planner module 114 to determine the maximum number of unique routes satisfying the route constraints. Furthermore, at least some of the route constraints serve the purpose of minimizing the overall path length of the route, and reducing total fuel/energy consumption. Once the maximum number of unique routes has been determined, the routes are sent to the candidate routes module 116.

FIG. 2B schematically illustrates a graphical user interface rendered by the candidate routes module 116, enabling selection of one or more of a plurality of candidate routes. Four non-limiting example routes are listed for a four-day trip, each starting and ending in Palma. This is because the route was set to a round trip and Palma was selected as a terminal node. Each route comprises three way ports (waypoint nodes). The routes are unique because their way ports differ.

The list may display technical information such as the amount of fuel/energy that would be consumed by following the route. The list may be ordered by energy consumption (fuel used), to display the routes in ascending or descending order of energy consumption. Therefore, the user can identify and select the route with the lowest energy consumption. The list may also display further numerical information about each candidate route, different than energy consumption.

The candidate routes module 116 may be configured to allow the user to select one or more of the presented list of candidate routes. The candidate routes module 116 then sends the selected candidate route(s) to the route navigation module 118.

FIG. 2C schematically illustrates a graphical user interface rendered by the route navigation module 118, displaying route parameters for the selected route. The rendered route parameters in FIG. 2C comprise the date of arrival at each node, a scheduled arrival time at each node, a scheduled departure time from each node, the speed of each leg, the energy consumed (e.g., fuel used) for each leg, or a combination thereof. The route parameters may have been determined by the planner module 114 and/or by the candidate routes module 116.

FIG. 3A is a flowchart illustrating an example computer-implemented method 300 of determining candidate routes. The method 300 may be implemented by the apparatus 100 or system 1.

At block 302, the method 300 comprises receiving route constraints. The route constraints comprise any one of more of the route constraints defined in relation to FIG. 2A. One or more of the route constraints may be determined from by user inputs, and one or more of the route constraints may be predetermined.

An example of a predetermined route constraint is a requirement that each candidate route is unique compared to already determined candidate routes. Another example is a requirement to not select the same node multiple times, at least for the way ports. Another example is a default value of a route constraint that can be changed by user input.

At block 304, the method 300 comprises determining a plurality of candidate routes including the route, wherein determining the plurality of candidate routes comprises, for each candidate route, selecting nodes for adding to the candidate route from the dataset of nodes, in dependence on the route constraints, and setting the selected nodes as part of the candidate route.

The determination of a candidate route may comprise determining, for a first slot, all possible nodes that satisfy the route constraints, then determining, for a second slot, all possible nodes that satisfy the route constraints, and so on for the rest of the slots. This is performed instead of determining the route in sequence in a slot-by-slot manner. This is much more computationally efficient because it reduces the number of routes that have to be discarded after they have been fully determined, due to route constraint violations that are only apparent after the whole/most of the route has been determined.

As alluded to earlier, block 304 may comprise determining the maximum number of possible candidate routes, satisfying the route constraints. In order to better determine the maximum number, the method 300 may be configured to automatically place sea days (if allowed within the cumulative/consecutive sea days limit) at all possible slot positions within the route. The method 300 may comprise identifying number of sea days requested by the user and number of consecutive sea days. Based on this information and the cruise duration, the method 300 may run a permutation logic to place sea days placed at different days (slots) in the route. Therefore, for a 7-night route, where the user constraints request 2 cumulative sea days and max consecutive of 2 sea days, the method 300 may generate combinations such as [1,2], [1,3], [1,4] etc., which indicate the days that are sea days. Then for each combination, the method 300 generates the candidate routes taking into account the extra travel time afforded by any sea days, allowing further nodes to be reached.

Similarly, the method 300 may be configured to automatically place 'must include' nodes at all possible slot positions within the route. This option would not be possible to do manually as the permutations and combinations would be too large. A 14-night route with six sea days would have around 4 billion permutations.

For the slot before a 'must include' node (e.g., end node of a round trip), the method 300 may calculate whether the 'must include' node is reachable from the currently selected departure node. The method 300 may determine the speed required and then determine whether the speed required is between the minimum and maximum speed constraints. Determining the speed required may be based on the determined distance between the nodes (e.g., from the dataset of nodes or an external map dataset), and the 'depart after time' and 'arrive before time' which may be taken as the departure and arrival times. If the 'must include' node is not reachable, the route or current departure node selection may be discarded.

At block 306, the method 300 comprises storing the candidate routes in memory, such as the at least one memory 104. Blocks 302, 304, and 306 may be executed by the planner module 114. In some examples, the method 300 may terminate at block 306. In another example, the method 300 proceeds to optional blocks 308 and 310.

At block 308, the method 300 comprises determining a list of the plurality of candidate routes. The candidate routes module 116 may execute block 308, in the manner described earlier in relation to FIG. 2B.

At block 310, the method 300 comprises causing output of information indicative of the list of the plurality of candidate routes on a graphical user interface. The candidate routes module 116 may execute block 308, in the manner described earlier in relation to FIG. 2B.

As shown in FIG. 2B, the information may be configured to discriminate between the plurality of determined candidate routes in dependence on the energy consumption of each candidate route. In FIG. 2B, the discrimination comprises displaying the energy consumption of each candidate route. Furthermore, FIG. 2B shows that the candidate routes may be automatically ranked by descending (or ascending) energy consumption. Alternatively, or additionally, block 310 may comprise highlighting candidate routes associated with a below-threshold energy consumption. Bold/large text or color may be used for highlighting, for example.

Therefore, the method 300 helps the user to determine which route, of the maximum possible route permutations, has the lowest energy consumption.

FIG. 3B is a flowchart illustrating an example computer-implemented method 300 of outputting real-time route guidance information. The method 300 may be implemented by the apparatus 100 or system 1. At least some blocks may be implemented by the route guidance computer 122. The method 300 may be an optional continuation of the flowchart of FIG. 3A, for implementations in which real-time guidance information may be provided.

At block 312, the method 300 comprises receiving a user selection of one or more of the plurality of candidate routes that were output in block 310. This is described earlier.

At block 314, the method 300 comprises receiving the route parameters of the route. The route parameters comprise the nodes of the route, the date of arrival at each node, the scheduled arrival time at each node, the scheduled departure time from each node, the speed of each leg, the energy consumed (e.g., fuel used) for each leg, or a combination thereof.

At block 314, the method 300 further comprises receiving information indicative of a current real-world position of the seaborne vessel 10. The information may comprise sensed position information or user input location information.

Sensed position information comprises geographical coordinates from a satellite navigation system (e.g., Global Positioning System, GPS), for example.

Information identifying a node that the seaborne vessel 10 is currently located at may be either sensed position information or user input location information. For example, the user may input to the route guidance computer 122 the identity of a node that the seaborne vessel 10 is docked or moored at.

At block 316, the method 300 further comprises causing output of real-time route guidance information in dependence on the route parameters and the information indicative of the current real-world position.

One example of real-time route guidance information is an alert to prompt the captain to stay within the route parameters.

One example alert is an alert in dependence on the method 300 determining that it is time to depart from the node that the seaborne vessel 10 is currently located at, according to the information indicative of the current real-world position, and the scheduled departure time.

Another example alert is an alert in dependence on the method 300 determining that the seaborne vessel 10 is late to depart relative to the scheduled departure time.

A further example alert is an alert in dependence on the method 300 determining that the speed of the seaborne vessel 10 along a current leg is different than the scheduled speed of the leg. This may involve sensing the speed, or sensing that the predicted arrival time at the next node is falling behind the scheduled arrival time (route parameter).

In some examples, the real-time route guidance information may provide path navigation instructions, to guide the captain to avoid deviations relative to a pre-planned path of the route/leg. The pre-planned path may be based on at least some of the route parameters.

Route guidance information may be rendered on any suitable user interface device 120, such as a display and/or a loudspeaker.

The route-guidance information ensures continued and guided human-machine interaction for achieving the technical effect of reduced energy consumption, of the selected route with the minimum energy consumption.

FIG. 4A schematically illustrates a node map comprising example open jaw routes, and FIG. 4B schematically illustrates a node map comprising example round trip routes.

FIG. 4A illustrates nodes (ports) 400A to 400H. Without constraints, the number of possible route permutations is 40320.

The black shaded node 400A is a home port, also referred to as a turn port. The hatch-shaded nodes 400C, 400G are 'must include' ports. The home port occupies the first slot. When determining the number of nodes which can be added to the second slot, the route constraints are taken into account. The node 400B may be too close, violating the minimum speed route constraint. The nodes 400C-400H may be too far away, violating the maximum speed route constraint and maximum consecutive sea days limit. Therefore, only the node 400E is viable, so node 400E is added to the second slot. The resulting first leg connects the nodes 400A and 400E and involves two sea days ('2SD') of sailing, satisfying a 2-consecutive sea days limit.

For the second leg to the third slot, it is possible to sail from node 400E to either 400C or 400I without violating the route constraints. Therefore, two route permutations are possible from node 400E and are shown as a solid line leg and broken line leg. Similar observations can be made for the remaining legs. Both illustrated routes (solid line route and broken line route) comprise the 'must include' nodes, as well as freely-selected nodes in other slots.

FIG. 5 is a flowchart illustrating an example computer-implemented method 500 of determining candidate nodes for a route in dependence on a bearing range. The method 500 may be implemented by the apparatus 100 or system 1. In some examples, at least some blocks of the method 500 may be a subroutine of block 304. The method 500 is also described with reference to FIGS. 6A-6B.

At block 502, the method 500 comprises receiving information indicative of a first geographical region 606A and information indicative of at a second geographical region 606B, in a first example implementation. The information may comprise the set of one or more required geographical regions 606A, 606B to include, from the region selector 114A.

FIG. 6A illustrates an example of the first and second geographical regions 606A, 606B. The first geographical region 606A may represent the Caribbean and the second geographical region 606B may represent the Mediterranean, in a non-limiting example. Therefore, the user has specified that the route must include at least one node in the Caribbean, and at least one node in the Mediterranean. Two nodes are shown in the Caribbean geographical region 606A, and three nodes are shown in the Mediterranean geographical region 606B. In reality, each region 606A, 606B may comprise dozens of nodes, or more. There is a vast number of possible node permutations, many of which involve sailing back and forth between the Caribbean and Mediterranean multiple times, and/or making multiple U-turns. The resulting meandering path results in high energy consumption.

Therefore, blocks 504-524 define a 'bearing range' process for reducing the energy consumption and increasing the linearity/reducing the meander of the path of the route. The bearing range α ensures that the route is directed generally towards the other geographical region 606B and reduces energy consumption. Without a bearing range α, each next leg of the route may be a 360-degree angle around the departure node.

At block 504, the method 500 comprises an optional decision block, comprising determining which leg of the route the set of candidate nodes are to be determined for. For example, if the leg number is a first value such as a first leg from a home port, the method 500 may skip to block 520 without determining a bearing range α for the current leg. If the leg number is a second value such as the second (or greater) leg of the route from a way port, the method 500 may progress to the next block 506 towards the determination of a bearing range α.

The decision block 504 may be useful in some cases. For example, if the home port is at the edge of a geographical region (e.g., 606A), the first leg may be 360 degrees around the home port so that the seaborne vessel 10 is not forced to depart the region immediately on its first leg. For example, a route from the Mediterranean to the Caribbean with Lisbon as the home port could be allowed to sail to Gibraltar on the first leg, which is in the opposite direction than the Caribbean. However, subsequent legs may need to be within the bearing range α, aiming towards the Caribbean.

Therefore, in the context of FIG. 6A, the first leg could connect home node 600A (first node) to node 600F if no bearing range α is used, and cannot connect to 600F if a bearing range α is used.

At decision block 506, the method 500 comprises determining information indicative of a distance of at least part of the route, and determines whether the information satisfies a condition associated with distance. If the condition is satisfied, the method 500 may progress to the next block 508 towards the determination of a bearing range α. If the condition is not satisfied, the method 500 may skip to block 520 without determining a bearing range α for the current leg.

The information does not necessarily have to be in units of distance. For example, the information could indicate the number of required geographical regions to include, from the region selector 114A. If the number is one region, the bearing range α may not be needed so the condition may not be satisfied. If the number is two regions, or more, the bearing range α may be needed so the condition may be satisfied. Therefore, a bearing range α may only be used when the route has to transition from one geographical region to another (or more).

In some examples, the information may be indicative of whether the route is a closed loop route or an open jaw route. This might be useful in situations where the bearing range α is only determined if the route is an open jaw route.

In some examples, the information may be indicative of a separation between the geographical regions 606A, 606B that the route is required to pass through. For example, if the user has selected two geographical regions that are fairly close to each other, such as Atlantic and Scandinavia, so the condition may not be satisfied. However, if the user selected regions that are far apart, such as the Mediterranean and Caribbean regions 606A, 606B, the condition may be satisfied.

At block 508, the method 500 comprises determining a bearing 608 between the first geographical region 606A and the second geographical region 606B.

Determining the bearing 608 may comprise determining the longitude and latitude coordinates representative of the regions 606A, 606B, and using a geodesic bearing formula to calculate the bearing direction. FIG. 6A illustrates the bearing 608 between the regions 606A, 606B, which in this case is about 85 degrees (East). The apparatus 100 may comprise information in the at least one memory 104, indicative of predetermined bearings between geographical region pairs. Alternatively, the apparatus 100 may calculate the bearing from geographical coordinate information describing where the regions 606A, 606B are.

At block 510, the method 500 comprises determining a bearing range α from a reference geographical position in dependence on the determined bearing 608, the bearing range α having an angular width, wherein the bearing range α aims from the first geographical region 606A towards the second geographical region 606B. Therefore, the leg is prevented from making a U-turn relative to the reference geographical position.

In FIG. 6A, the reference geographical position is the position of the home node 600A, even if the current leg is from a departure node 600B other than the home node 600A. In other words, the centre of the bearing range α stays with the home node 600A rather than changing from leg to leg. Therefore, the centre of the bearing range α extends from the home node 600A as shown by the dotted line 604A (bearing), which is parallel to the previously determined bearing 608.

The angular width of the illustrated bearing range α is 30 degrees to each side of the dotted line 604A, or 60 degrees overall. The bearing range α is centered on the determined bearing of 85 degrees, so the bearing range α is 55 degrees to 115 degrees, pointing generally towards the second geographical region 606B. The angular width of the bearing range α is not limited to 60 degrees as shown in FIG. 6A, and may be wider or narrower. For example, it may be less than 180 degrees (90 degrees to either side of the determined bearing).

Determining the bearing range α may comprise determining the angular width of the bearing range α. The angular width may be predetermined in the at least one memory 104 of the apparatus 100, and may be a static value. Alternatively, it may be calculated.

In one implementation, determining the angular width comprises receiving a user-inputted angular width, based on information received from the user interface device 120.

If the angular width can be calculated/changed, then determining the angular width may be dependent on at least one of the route constraints.

For example, angular width may depend on the information indicative of a distance of at least part of the route. The information could indicate the number of required geographical regions to include, from the region selector 114A. If the number is 'n' regions, the angular width may have a first value, and if the number is 'n+1' regions, the angular width may have a second value wider than the first value.

In some examples, the information may be indicative of whether the route is a closed loop route (round trip) or an open jaw route. This may affect the angular width since a round trip needs to travel in a circle.

In some examples, the information may be indicative of a separation between the geographical regions 606A, 606B (or 'must include' nodes) that the route is required to pass through. For example, if the user has selected two geographical regions that are fairly close to each other, the angular width may be narrower than if the regions are far apart.

At decision block 514, the method 500 comprises determining whether the set of candidate nodes comprises a number of candidate nodes within the bearing range α below a threshold. If the angular width is too narrow or the geographical region has few nodes, there may be insufficient nodes to choose between. Therefore, it may be useful to widen the angular width if insufficient candidate nodes are found.

If the number is below the threshold, the method 500 proceeds to block 516 which modifies the bearing range α, then loops back to decision block 514. The modification may comprise widening the bearing range, and/or may comprise rotating the bearing range α (e.g., from 85 to 95 degrees). If or when the number of candidate nodes is above the threshold, the method 500 proceeds to block 518.

At block 518, the method 500 comprises determining the set of candidate nodes for adding to the route from the dataset of nodes, in dependence on which of the nodes are within the bearing range α.

In the example of FIG. 6A, the nodes 600C, 600D, 600E are within the bearing range α and can be selected. The node 600F is outside the bearing range α so cannot be selected.

At block 520, the method 500 comprises selecting a node (or nodes) from the set of candidate nodes, in dependence on one or more route constraints other than the bearing range α. This refers to any one or more of the other route constraints described earlier. Therefore, multipole route constraints are used, including but not limited to the bearing range α.

As described earlier, a plurality of route permutations may be determined from the nodes selected at block 520, such as every possible node for the current leg that can be reached without violating any of the route constraints including the bearing range α.

At block 522, the method 500 comprises setting the selected node (e.g., 600B) as part of the candidate route, in the at least one memory 104.

At block 524, the method 500 selects the next leg and then loops back to an earlier block such as 504. Once the nodes for the final leg have been selected, the method 500 may control the user interface device 120 to render a graphical user interface indicative of the candidate route. For example, the candidate route may be rendered, showing the selected nodes. In some examples, a list of candidate routes can be determined and presented to the user (blocks 308, 310) who can select a route with the lowest indicated energy consumption, as described earlier. Once the user has selected a route, the later-described method 700 may be executed for the selected route.

In another implementation of the method 500, block 502 receives information indicative of a first node (e.g., 600A) and information indicative of a second node (e.g., any of 600C-600E), instead of information indicative of first and second geographical regions 606A, 606B. In a further example, block 502 receives a node and a region, or a region and a node. This is to illustrate that a bearing 604A/608 could be determined between a pair of regions, a pair of nodes, a region to a node, or a node to a region.

FIG. 6B shows a further implementation in which the centre 604B of the bearing range α does not stay with the home node 600A. The centre 604B of the bearing range α may be the departure node 600B of the current leg, and may move from leg to leg. Therefore, whereas FIG. 6A allows some U-turns as the seaborne vessel 10 gets further away from the home port, FIG. 6B always prevents U-turns. Separately, FIG. 6B illustrates that the bearing 604B could be parallel to the bearing of the previous leg 602, rather than parallel to the direction from the home port to the second node/region. This encourages the seaborne vessel 10 to select nodes that are aligned in a straighter path.

FIG. 7 is a flowchart illustrating an example computer-implemented method 700 of determining a scheduled departure time and/or a scheduled arrival time, in dependence on information indicative of an energy consumption rate of a seaborne vessel 10. The method 700 may be implemented by the apparatus 100 or system 1.

In some examples, at least some blocks of the method 700 may be a subroutine of block 304, or may be performed after selection of a route at block 312. The latter may advantageously reduce compute requirements, by only performing the method 700 for the selected route rather than all possible routes.

The method 700 is described with reference to FIGS. 8A-8B and FIGS. 9A-9B. FIG. 8A schematically illustrates a map of nodes 800A-800F, including a departure node 800B and an arrival node 800C which have already been determined. The arrival node 800C has been selected because it is reachable within the route constraints. For example, the 'depart after time' is 18:00 and the 'arrive before time' is 09:00. The minimum speed constraint is 10 knots, and the maximum speed constraint is 19 knots. Zero sea days are allowed, so the leg must reach the arrival node 800C overnight. The inner arc/circle represents the position the seaborne vessel 10 would reach at 10 knots, and the outer arc/circle represents the position the seaborne vessel 10 would reach at 19 knots. Therefore, the node 800C between the two arcs/circles is reachable between the minimum and maximum speeds, without needing an extra sea day or departing too early or arriving too late.

Based on the specific distance of the arrival node 800C (e.g., 150 nautical miles), the seaborne vessel 10 would need to sail at 10 knots to reach the arrival node 800C if departing at 18:00 and arriving at 09:00 the next morning.

FIG. 9A illustrates a graph of energy consumption rate with respect to speed, and FIG. 9B illustrates a graph of total energy consumption with respect to departure time.

Referring back to FIG. 7, at block 702, the method 700 comprises receiving information indicative of a preliminary departure time and a preliminary arrival time, of the leg of the route of the seaborne vessel 10, wherein a distance of the leg and the preliminary departure time and preliminary arrival time collectively indicate a preliminary speed of the leg.

In some examples, the preliminary departure time is equal to the 'depart after time' by default, and the preliminary arrival time is equal to the 'arrive before time' by default. In the example of FIG. 8A, the preliminary departure time is 18:00 and the preliminary arrival time is 09:00. Furthermore, the preliminary speed of the leg is 10 knots as described above.

At block 704, the method 700 comprises receiving information indicative of a fuel/energy consumption rate of the seaborne vessel 10. Optionally, the information indicates a relationship between a speed of the seaborne vessel 10 and an energy consumption rate. For example, the information may comprise a lookup table or equivalent data structure, or an equation. FIG. 9A graphically illustrates an example of the information, showing a nonlinear relationship between energy consumption rate and speed. As shown, the energy consumption rate increases at an increasing rate as the speed increases.

The information may be predetermined and received from the at least one memory 104, or may be input by an end user. For a fleet of seaborne vessels, the user may input an identifier of the seaborne vessel 10, and the method 700 may look up the information from a data structure comprising information for a plurality of seaborne vessels, in dependence on the identifier.

At block 706, the method 700 comprises determining a parameter indicative of the total energy consumption of the leg, such as total fuel burnt, based on the preliminary departure time and preliminary arrival time.

Block 706 includes determining the required speed of the leg based on the preliminary departure and arrival times, and the determined distance of the leg. In the example of FIG. 8A, node 800C is 150 nautical miles from node 800A, and the vessel departs at 18:00 and arrives at 09:00. The duration is therefore 15 hours, so the required speed is 150/15=10 knots.

Block 706 further includes determining the energy consumption rate for the required speed, based on the information received at block 704. FIG. 9A shows that a speed of 10 knots corresponds to a fuel burn rate of 2.2 tons per hour. As shown, faster speeds would increase the fuel burn rate at an increasing rate of change.

Block 706 further includes multiplying the energy consumption rate for the required speed (2.2 tons per hour), with the duration of the leg (15 hours), to determine the parameter indicative of total energy consumption (total fuel consumption=33 tons).

At block 708, the method 700 comprises determining the parameter indicative of total energy consumption of the leg again, for each of a plurality of departure times, wherein the departure time is an iteration variable. For example, the departure time iteration variable may be changed in increments of a first duration, such as one hour, and the parameter indicative of total energy consumption may be recalculated for each increment of the departure time iteration variable. The arrival time may be kept as the preliminary arrival time. This establishes the relationship between departure time and total energy consumption, as can be seen in FIG. 9B. The graph of FIG. 9B comprises a convex curve with a minimum of total energy consumption. The departure time corresponding to the minimum total energy consumption is the departure time that should be used.

FIG. 9B shows that the departure time for minimizing the total energy consumption is around 10 μm. This shortens the duration to 11 hours, which corresponds to a required speed of 150/11=13.6 knots. The fuel burn rate for 13.6 knots may be 2.4 tons per hour, as shown in FIG. 9A. The total energy consumption is now 11 hours*2.4 tons per hour=26.4 tons. This represents a 6.6 ton fuel saving despite sailing at a faster speed.

The target value of the departure time may then be further optimized by changing the departure time iteration variable in shorter-duration increments to either side of the target value. For example, the increments may be 1-20 minutes depending on the required level of accuracy. In FIG. 9B, the illustrated calculation points are more densely clustered around the minimum total energy consumption, indicating that the iterative search for the minimum energy consumption point has been carried out computationally efficiently.

The range of departure times that can be used may be constrained by an allowable departure range, described below, and by the minimum and maximum speeds of the vessel. If the minimum value of the total energy consumption cannot be achieved by changing only the departure time, the preliminary arrival time may be changed as well.

The allowable departure range limits how much earlier the scheduled departure time is allowed to be than the preliminary departure time, and/or how much later the scheduled departure time is allowed to be than the preliminary departure time.

Optionally, the allowable departure range has a duration of up to 30 minutes before the preliminary departure time, and longer (e.g., unlimited) after the preliminary departure time. In other examples, the allowable departure range is wider than 30 minutes, such as up to 1 hour, up to 1.5 hours, or less than 2 hours. The range may allow advancing and delaying. As stated above, the range may allow more delaying than advancing.

If the target value of the departure time required to achieve the minimum total energy consumption is outside the allowable departure range, then the seaborne vessel 10 may only realize some of the fuel/energy efficiency benefits. Likewise, if the target value of the departure time would require the seaborne vessel 10 to sail faster than its maximum speed constraint, the departure time may be prevented from being delayed to a time requiring the seaborne vessel 10 from sailing faster than the maximum speed constraint.

Block 708 may therefore comprise determining a scheduled arrival time different than the preliminary arrival time ('arrive before time'). The same method may be used as described above, except the departure time is now a fixed value and the total energy consumption is calculated for a plurality of arrival times, changed incrementally. The fixed value of the departure time may represent a value different than the preliminary departure time and towards the target value of the departure time.

Changing the arrival time has a lower priority than changing the departure time. This is because the arrival time is changed in dependence on the target value of the departure time required to achieve the minimum total energy consumption being outside the allowable departure range. If the target departure time is within the allowable departure range, the changing of the arrival time may not be carried out or may be inhibited. An effect is that modifying (e.g., delaying) the departure time is prioritized over modifying (e.g., advancing) the arrival time. An advantage is that there is more utility for the occupants if the departure time is delayed e.g. from 6 μm to 10 μm, than if the arrival time is advanced e.g. from 9 am to 5 am. This is because occupants can usefully spend longer at the departure port, whereas they are unlikely to wake up at 5 am to disembark at the arrival port. In other examples, both the departure and arrival times may be optimised with equal priority.

Modifying the arrival time may comprise modifying the arrival time of the leg from the preliminary arrival time, within an allowable arrival range (e.g., predetermined arrival range) of the preliminary arrival time. The allowable arrival range limits how much earlier the scheduled arrival time is allowed to be than the preliminary arrival time, and/or how much later the scheduled arrival time is allowed to be than the preliminary arrival time. The allowable arrival range is different than the allowable departure range. For example, the allowable arrival range is wider than the allowable departure range. Optionally, the allowable arrival range has a duration of up to 4 hours, allowing advancing up to 2 hours and delaying up to 2 hours relative to the preliminary arrival time. In other examples, the allowable arrival range is wider or narrower.

At block 710, the method 700 comprises determining a scheduled departure time different than the preliminary departure time/'depart after time', and/or a scheduled arrival time different than the preliminary arrival time/'arrive before time'. Its value is equal to the target value of the departure time, or towards the target value of the departure time. The preliminary arrival time may be unchanged, or may also be changed if required. A visual example is shown in FIG. 8B, where the departure time has been delayed from 18:00 to 22:00.

At block 712, the method 700 comprises modifying the preliminary departure time to the scheduled departure time, in memory, and/or modifying the preliminary arrival time to the scheduled arrival time, in memory. The memory may be the at least one memory 104 of the apparatus 100. In some examples, block 712 comprises controlling the user interface device 120 to render a graphical user interface comprising the scheduled departure time and/or scheduled arrival time.

The method 700 may be repeated for each leg of the route.

Furthermore, the apparatus 100 may be configured to determine first information indicative of the energy consumption of the leg or route with and without the use of the method 700 of FIG. 7, and output information indicative of an amount of energy saved associated with following the scheduled departure and arrival times of FIG. 7. This may assist a user in determining whether to override the calculation and stick to the preliminary departure/arrival times, or go with the new (more efficient) departure/arrival times.

FIG. 1A illustrates an example of a controller 101 suitable for use in an apparatus 100. Implementation of a controller 101 may be as controller circuitry. The controller 101 may be implemented in hardware alone, have certain aspects in software including firmware alone or can be a combination of hardware and software (including firmware).

As illustrated in FIG. 1A the controller 101 may be implemented using instructions that enable hardware functionality, for example, by using executable instructions 108 in a general-purpose or special-purpose processor 106 that may be stored on a machine readable storage medium (disk, memory etc.) to be executed by such a processor 106.

The processor 106 is configured to read from and write to the memory 104. The processor 106 may also comprise an output interface via which data and/or commands are output by the processor 106 and an input interface via which data and/or commands are input to the processor 106.

The memory 104 stores instructions, program, or code 108 that controls the operation of the apparatus 100 when loaded into the processor 106. The instructions, program, or code 108, provide the logic and routines that enables the apparatus 100 to perform the methods illustrated in the accompanying FIGs. The processor 106 by reading the memory 104 is configured to load and execute the instructions, program, or code 108.

The apparatus 100 comprises: at least one processor 106; and at least one memory 104 storing instructions that, when executed by the at least one processor 106, cause the apparatus at least to: execute any one or more of the methods described herein.

In some examples, there is a (computer implemented) system 1 comprising the apparatus as defined above, and a route guidance computer 122, the route guidance computer 122 comprising at least one processor; and at least one memory storing instructions that, when executed by the at least one processor, cause the route guidance computer 122 at least to: execute any one or more of the methods described herein.

As illustrated in FIG. 1C, the instructions, program, or code 108 may arrive at the apparatus 100 via any suitable delivery mechanism 124. The delivery mechanism 124 may be, for example, a machine readable medium, a computer-readable medium, a non-transitory computer-readable storage medium, a computer program product, a memory device, a record medium such as a solid-state memory, an article of manufacture that comprises or tangibly embodies the instructions 108. The delivery mechanism may be a signal configured to reliably transfer the instructions 108. The apparatus 100 may propagate or transmit the instructions 108 as a data signal.

The instructions 108 may be comprised in a computer program, a non-transitory computer readable medium, a computer program product, a machine readable medium. In some but not necessarily all examples, the instructions 108 may be distributed over more than one computer program.

Although the memory 104 is illustrated as a single component/circuitry it may be implemented as one or more separate components/circuitry some or all of which may be integrated/removable and/or may provide permanent/semi-permanent/dynamic/cached storage.

Although the processor 106 is illustrated as a single component/circuitry it may be implemented as one or more separate components/circuitry some or all of which may be integrated/removable. The processor 106 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry including quantum processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The blocks illustrated in the accompanying Figs may represent steps in a method and/or sections of code in the instructions 108. The illustration of a particular order to the blocks does not necessarily imply that there is a required or preferred order for the blocks and the order and arrangement of the block may be varied. Furthermore, it may be possible for some blocks to be omitted.

As used here 'module' refers to a unit or apparatus that excludes certain parts/components that would be added by an end manufacturer or a user. The apparatus 100 can, for example be a module. A controller 101 of the apparatus 100 can, for example be a module.

Where a structural feature has been described, it may be replaced by means for performing one or more of the functions of the structural feature whether that function or those functions are explicitly or implicitly described.

The systems, apparatus, methods, and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The above-described example methods are designed to exploit particular technical properties of the technical system on which they are implemented to bring about a technical effect such as efficient use of computer process capacity, and power consumption.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to 'comprising only one . . . ' or by using 'consisting.'

In this description, the wording 'connect', 'couple' and 'communication' and their derivatives mean operationally connected/coupled/in communication. It should be appreciated that any number or combination of intervening components can exist (including no intervening components), i.e., to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database, or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can', or 'may' refers to a particular instance in a class of examples. A property of the instance can be a property of only that instance or a property of the class or a property of a sub-class of the class that includes some but not all the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

The description of a feature, such as an apparatus or a component of an apparatus, configured to perform a function, or for performing a function, should additionally be considered to also disclose a method of performing that function. For example, description of an apparatus configured to perform one or more actions, or for performing one or more actions, should additionally be considered to disclose a method of performing those one or more actions with or without the apparatus.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

As used herein, the terms "the at least one" and "the one or more" mean "any one of the at least one" and "any one of the one or more" respectively.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance the Applicant may seek protection via the claims in respect of any patentable feature or combination of features hereinbefore referred to and/or shown in the drawings whether or not emphasis has been placed thereon.

What is claimed is:

1. An apparatus comprising:

at least one processor; and at least one memory storing instructions that, when executed by the at least one processor, cause the apparatus at least to perform:

receiving route constraints of a seaborne vessel, the route constraints comprising at least a departure time request and an arrival time request; wherein:

the departure time request comprises a depart after time;

the arrival time request comprises an arrive before time; and the route constraints further comprise a minimum speed of the seaborne vessel and a maximum speed of the seaborne vessel;

receiving information indicative of a preliminary departure time and a preliminary arrival time, of a leg of a route of the seaborne vessel; wherein the preliminary departure time is based on the depart after time;

the preliminary arrival time is based on the arrive before time; and a preliminary speed of the leg is a value between the minimum speed and the maximum speed;

selecting nodes for adding to the route from a dataset of nodes, in dependence on the route constraints; wherein:

the leg of the route is between a pair of the selected nodes; and selecting the nodes for adding to the route comprises determining which nodes of the dataset of nodes are reachable by the seaborne vessel departing in accordance with the depart after time, arriving in accordance with the arrive before time, and travelling between the minimum speed and maximum speed;

receiving information indicative of an energy consumption rate of the seaborne vessel;

determining at least one of a scheduled departure time different than the preliminary departure time, or a scheduled arrival time different than the preliminary arrival time, in dependence on the information indicative of an energy consumption rate of the seaborne vessel; wherein:

determining the scheduled departure time and/or scheduled arrival time is configured to change a speed of the leg from the preliminary speed to a different speed, requiring the different speed to be between the minimum speed and maximum speed to reduce a total energy consumption of the leg compared to traveling at the preliminary speed; and the scheduled departure time is different than the depart after time and/or the scheduled arrival time is different than the arrive before time; and modifying the preliminary departure time to the scheduled departure time, in the at least one memory, and/or modifying the preliminary arrival time to the scheduled arrival time, in the at least one memory.

2. The apparatus of claim 1, wherein determining the scheduled departure time comprises modifying a departure time of the leg from the preliminary departure time, within an allowable departure range of the preliminary departure time.

3. The apparatus of claim 2, wherein the modifying of the departure time is dependent on the preliminary arrival time, and wherein determining the scheduled arrival time different than the preliminary arrival time has a lower priority than modifying the departure time.

4. The apparatus of claim 2, wherein determining the scheduled arrival time comprises modifying an arrival time of the leg from the preliminary arrival time, within an allowable arrival range of the preliminary arrival time.

5. The apparatus of claim 4, wherein the allowable arrival range is different than the allowable departure range.

6. The apparatus of claim 5, wherein the allowable arrival range is wider than the allowable departure range.

7. The apparatus of claim 1, wherein the instructions, when executed by the at least one processor, cause the apparatus at least to perform:

determining a plurality of candidate routes including the route, wherein determining the plurality of candidate routes comprises, for each candidate route, selecting nodes for adding to the candidate route from the dataset of nodes, in dependence on the route constraints, and setting the selected nodes as part of the candidate route;

determining a list of the plurality of candidate routes, in dependence on an overall energy consumption of each candidate route; and causing output of information indicative of the list of the plurality of candidate routes on a graphical user interface of a user interface device, wherein the information is configured to discriminate between the plurality of determined candidate routes in dependence on the energy consumption of each candidate route.

8. The apparatus of claim 1, wherein determining the scheduled departure time and/or scheduled arrival time is further dependent on a distance of the leg.

9. The apparatus of claim 1, wherein determining the scheduled departure time and/or scheduled arrival time comprises iteratively determining the total energy consumption for each of a plurality of departure times and/or arrival times, until a minimum total energy consumption is established, and wherein the scheduled departure time and/or scheduled arrival time is based on the minimum total energy consumption.

10. A computer-implemented method comprising:

receiving route constraints of a seaborne vessel, the route constraints comprising at least a departure time request and an arrival time request; wherein:

the departure time request comprises a depart after time;

the arrival time request comprises an arrive before time; and the route constraints further comprise a minimum speed of the seaborne vessel and a maximum speed of the seaborne vessel;

receiving information indicative of a preliminary departure time and a preliminary arrival time, of a leg of a route of the seaborne vessel; wherein the preliminary departure time is based on the depart after time;

the preliminary arrival time is based on the arrive before time; and a preliminary speed of the leg is a value between the minimum speed and the maximum speed;

selecting nodes for adding to the route from a dataset of nodes, in dependence on the route constraints; wherein:

the leg of the route is between a pair of the selected nodes; and selecting the nodes for adding to the route comprises determining which nodes of the dataset of nodes are reachable by the seaborne vessel departing in accordance with the depart after time, arriving in accordance with the arrive before time, and travelling between the minimum speed and maximum speed;

receiving information indicative of an energy consumption rate of the seaborne vessel;

determining at least one of a scheduled departure time different than the preliminary departure time, or a scheduled arrival time different than the preliminary arrival time, in dependence on the information indicative of an energy consumption rate of the seaborne vessel; wherein:

determining the scheduled departure time and/or scheduled arrival time is configured to change a speed of the leg from the preliminary speed to a different speed, requiring the different speed to be between the minimum speed and maximum speed to reduce a total energy consumption of the leg compared to traveling at the preliminary speed; and the scheduled departure time is different than the depart after time and/or the scheduled arrival time is different than the arrive before time; and modifying the preliminary departure time to the scheduled departure time, in the at least one memory, and/or modifying the preliminary arrival time to the scheduled arrival time, in the at least one memory.

11. A non-transitory computer readable medium comprising instructions that, when executed by an apparatus, cause the apparatus or system to perform:

receiving route constraints of a seaborne vessel, the route constraints comprising at least a departure time request and an arrival time request; wherein:

the departure time request comprises a depart after time;

the arrival time request comprises an arrive before time; and the route constraints further comprise a minimum speed of the seaborne vessel and a maximum speed of the seaborne vessel;

receiving information indicative of a preliminary departure time and a preliminary arrival time, of a leg of a route of the seaborne vessel; wherein the preliminary departure time is based on the depart after time;

the preliminary arrival time is based on the arrive before time; and a preliminary speed of the leg is a value between the minimum speed and the maximum speed;

selecting nodes for adding to the route from a dataset of nodes, in dependence on the route constraints; wherein:

the leg of the route is between a pair of the selected nodes; and selecting the nodes for adding to the route comprises determining which nodes of the dataset of nodes are reachable by the seaborne vessel departing in accordance with the depart after time, arriving in accordance with the arrive before time, and travelling between the minimum speed and maximum speed;

receiving information indicative of an energy consumption rate of the seaborne vessel;

determining at least one of a scheduled departure time different than the preliminary departure time, or a scheduled arrival time different than the preliminary arrival time, in dependence on the information indicative of an energy consumption rate of the seaborne vessel; wherein:

determining the scheduled departure time and/or scheduled arrival time is configured to change a speed of the leg from the preliminary speed to a different speed, requiring the different speed to be between the minimum speed and maximum speed to reduce a total energy consumption of the leg compared to traveling at the preliminary speed; and the scheduled departure time is different than the depart after time and/or the scheduled arrival time is different than the arrive before time; and modifying the preliminary departure time to the scheduled departure time, in the at least one memory, and/or modifying the preliminary arrival time to the scheduled arrival time, in the at least one memory.

* * * * *